US011263487B2

(12) United States Patent
Li et al.

(10) Patent No.: US 11,263,487 B2
(45) Date of Patent: Mar. 1, 2022

(54) MULTI-TASK GAN, AND IMAGE TRANSLATOR AND IMAGE CLASSIFIER TRAINED THEREBY

(71) Applicant: Microsoft Technology Licensing, LLC, Redmond, WA (US)

(72) Inventors: Qun Li, Lake Forest Park, WA (US); Changbo Hu, Fremont, CA (US); Keng-hao Chang, San Jose, CA (US); Ruofei Zhang, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 44 days.

(21) Appl. No.: 16/830,224

(22) Filed: Mar. 25, 2020

(65) Prior Publication Data
US 2021/0303927 A1    Sep. 30, 2021

(51) Int. Cl.
*G06K 9/62* (2006.01)
*G06N 3/08* (2006.01)

(52) U.S. Cl.
CPC ........... *G06K 9/6257* (2013.01); *G06K 9/628* (2013.01); *G06K 9/6253* (2013.01); *G06K 9/6262* (2013.01); *G06N 3/08* (2013.01)

(58) Field of Classification Search
CPC .... G06K 9/6257; G06K 9/628; G06K 9/6253; G06K 9/6262; G06N 3/08
USPC ........................................................ 382/157
See application file for complete search history.

(56) References Cited

U.S. PATENT DOCUMENTS

2019/0096056 A1*  3/2019  Giering ................ G06K 9/6262
2020/0219304 A1*  7/2020  Kavidayal .............. G06K 9/622

OTHER PUBLICATIONS

Li, et al., "Mt-Gan: A Training Framework to Enhance Image Classification Task with Image Translation," in 2021 IEEE International Conference on Multimedia & Expo Workshops (ICMEW), Jul. 2021, 4 pages.
Kingma, et al., "Auto-Encoding Variational Bayes," arXiv:1312.6114v10 [stat.ML], May 1, 2014, 14 pages.
Rezende, et al., "Stochastic Backpropagation and Approximate Inference in Deep Generative Models," in Proceedings of the 31st International Conference on Machine Learning, PMLR, vol. 32, No. 2, 2014, 9 pages.

(Continued)

*Primary Examiner* — Juan A Torres

(57) ABSTRACT

A computer-implemented technique uses a generative adversarial network (GAN) to jointly train a generator neural network ("generator") and a discriminator neural network ("discriminator"). Unlike traditional GAN designs, the discriminator performs the dual role of: (a) determining one or more attribute values associated with an object depicted in input image fed to the discriminator; and (b) determining whether the input image fed to the discriminator is real or synthesized by the generator. Also unlike traditional GAN designs, an image classifier can make use of a model produced by the GAN's discriminator. The generator receives generator input information that includes a conditional input image and one or more conditional values that express desired characteristics of the generator output image. The discriminator receives the conditional input image in conjunction with a discriminator input image, which corresponds to either the generator output image or a real image.

20 Claims, 14 Drawing Sheets

(56) References Cited

OTHER PUBLICATIONS

Goodfellow, et al., "Generative Adversarial Nets," in Advances in Neural Information Processing Systems 27, 2014, 9 pages.

Denton, et al., "Deep Generative Image Models using a Laplacian Pyramid of Adversarial Networks," in Advances in Neural Information Processing Systems 28, 2015, 9 pages.

Gauthier, Jon, "Conditional generative adversarial nets for convolutional face generation," available at http://cs231n.stanford.edu/reports/2015/pdfs/jgauthie_final_report.pdf, Class project for Stanford CS231N: Convolutional Neural Networks for Visual Recognition, winter semester 2014, 9 pages.

Mirza et al., "Conditional Generative Adversarial Nets," arXiv:1411.1784v1 [cs.LG], Nov. 6, 2014, 7 pages.

Isola, et al., "Image-to-Image Translation with Conditional Adversarial Networks," arXiv:1611.07004v3 [cs.CV], Nov. 26, 2018, 17 pages.

Brock, et al., "Neural Photo Editing with Introspective Adversarial Networks," arXiv:1609.07093v3 [cs.LG], Feb. 6, 2017, 15 pages.

Taigman, et al., "Unsupervised Cross-Domain Image Generation," arXiv:1611.02200v1 [cs.CV], Nov. 7, 2016, 14 pages.

Ledig, et al., "Photo-Realistic Single Image Super-Resolution Using a Generative Adversarial Network," arXiv:1609.04802v5 [cs.CV], May 25, 2017, 19 pages.

Park, et al., "Semantic Image Synthesis with Spatially-Adaptive Normalization," rXiv:1903.07291v2 [cs.CV], Nov. 5, 2019, 19 pages.

Hsiao, et al., "Fashion++: Minimal Edits for Outfit Improvement," arXiv:1904.09261v3 [cs.CV], Sep. 2, 2019, 17 pages.

Odena, et al., "Conditional Image Synthesis with Auxiliary Classifier GANs," in Proceedings of the 34th International Conference on Machine Learning, PMLR 70, 2017, 10 pages.

Zhang, et al., "StackGAN: Text to Photo-realistic Image Synthesis with Stacked Generative Adversarial Networks," arXiv:1612.03242v2 [cs.CV], Aug. 5, 2017, 14 pages.

Zhang, et al., "StackGAN++: Realistic Image Synthesis with Stacked Generative Adversarial Networks," arXiv:1710.10916v3 [cs.CV], Jun. 28, 2018, 16 pages.

Zhang, et al., "A Survey on Multi-Task Learning," arXiv:1707.08114v2 [cs.LG], Jul. 27, 2018, 20 pages.

Liu, et al., "Multi-Task Deep Neural Networks for Natural Language Understanding," arXiv:1901.11504v2 [cs.CL], May 30, 2019, 10 pages.

Russakovsky, et al., "ImageNet Large Scale Visual Recognition Challenge," arXiv:1409.0575v3 [cs.CV], Jan. 30, 2015, 43 pages.

Ronneberger, et al., "U-Net: Convolutional Networks for Biomedical Image Segmentation," arXiv:1505.04597v1 [cs.CV], May 18, 2015, 8 pages.

Ioffe, et al., "Batch Normalization: Accelerating Deep Network Training by Reducing Internal Covariate Shift," in Proceedings of the 32nd International Conference on Machine Learning, vol. 37, 2015, 9 pages.

Simonyan, et al., "Very Deep Convolutional Networks for Large-Scale Image Recognition," arXiv:1409.1556v6 [cs.DV], Apr. 10, 2015, 14 pages.

Pathak, "Context Encoders: Feature Learning by Inpainting," arXiv:1604.07379v2 [cs.CV], Nov. 21, 2016, 12 pages.

Liu, et al., "Deepfashion: Powering robust clothes recognition and retrieval with rich annotations," in Proceedings of the IEEE Conference on Computer Vision and Pattern Recognition, 2016, CVF Open Access reprint, 9 pages.

Gong, et al., "Deep Convolutional Ranking for Multilabel Image Annotation," arXiv:1312.4894v2 [cs.CV], Apr. 14, 2014, 9 pages.

Yang, et al., "Articulated pose estimation with flexible mixtures-of-parts," in CVPR 2011, 2011, pp. 1385-1392.

Chen, et al., "Describing Clothing by Semantic Attributes," in Lecture Notes in Computer Science, vol. 7574, Springer, Berlin, Heidelberg, ECCV'12: Proceedings of the 12th European Conference on Computer Vision, vol. Part III, Oct. 2012, pp. 609-623.

Huang, et al., "Cross-domain Image Retrieval with a Dual Attribute-aware Ranking Network," arXiv:1505.07922v1 [cs.CV], May 29, 2015, 12 pages.

Heusel, et al. "GANs Trained by a Two Time-Scale Update Rule Converge to a Local Nash Equilibrium," arXiv:1706.08500v6 [cs.LG], Jan. 12, 2018, 38 pages.

Binkowsk, et al., "Demystifying MMD GANs," arXiv:1801.01401v4 [stat.ML], Mar. 21, 2018, 36 pages.

Brock, et al., "Large Scale GAN Training for High Fidelity Natural Image Synthesis," arXiv:1809.11096v2 [cs.LG], Feb. 25, 2019, 35 pages.

Chen, et al., "Self-Supervised GANs via Auxiliary Rotation Loss," arXiv:1811.11212v2 [cs.LG], Apr. 9, 2019, 15 pages.

Choi, et al., "StarGAN: Unified Generative Adversarial Networks for Multi-Domain Image-to-Image Translation," arXiv:1711.09020v3 [cs.CV], Sep. 21, 2018, 15 pages.

Corbiere, et al., "Leveraging Weakly Annotated Data for Fashion Image Retrieval and Label Prediction," arXiv:1709.09426v1 [cs.CV], Sep. 27, 2017, 7 pages.

Karras, et al., "Progressive Growing of GANs for Improved Quality, Stability, and Variation," arXiv:1710.10196v3 [cs.NE], Feb. 26, 2018, 26 pages.

Li, et al., "Triple Generative Adversarial Nets," in Advances in Neural Information Processing Systems 30, 2017, 11 pages.

Liu, et al., "Unsupervised Image-to-Image Translation Networks," in Advances in Neural Information Processing Systems 30, 2017, 9 pages.

Lucic, et al., "High-Fidelity Image Generation With Fewer Labels," arXiv:1903.02271v2 [cs.LG], May 14, 2019, 23 pages.

Mescheder, et al., "Which Training Methods for GANs do actually Converge?," arXiv:1801.04406v4 [cs.LG], Jul. 31, 2018, 39 pages.

Wang, et al., "High-Resolution Image Synthesis and Semantic Manipulation With Conditional GANs," arXiv:1711.11585v2 [cs.CV], Aug. 20, 2018, 14 pages.

Wang, et al., "Attentive Fashion Grammar Network for Fashion Landmark Detection and Clothing Category Classification," in Proceedings of the 2018 IEEE/CVF Conference on Computer Vision and Pattern Recognition, Jun. 2018, CVF Open Access reprint, 10 pages.

Zhu, et al., "Unpaired Image-To-Image Translation Using Cycle-Consistent Adversarial Networks," arXiv:1703.10593v6 [cs.CV], Nov. 15, 2018, 18 pages.

Liu, et al., "Deep Fashion Analysis with Feature Map Upsampling and Landmark-driven Attention," in Computer Vision—ECCV 2018 Workshops, ECCV 2018, Lecture Notes in Computer Science, vol. 11131, CVF Open Access, 7 pages.

Gatys, et al., "Image Style Transfer Using Convolutional Neural Networks," in 2016 IEEE Conference on Computer Vision and Pattern Recognition (CVPR), 2016, CVF Open Access reprint, 10 pages.

Li, et al., U.S. Appl. No. 16/422,992, "Pipeline for Identifying Supplemental Content Items That are Related to Objects in Images," filed on May 25, 2019, 35 pages.

PCT Search Report and Written Opinion for PCT/US2021/018274, dated May 21, 2021, 17 pages.

Murali, et al., "Image Generation and Style Transfer Using Conditional Generative Adversarial Networks," in Proceedings of the 2019 18th IEEE International Conference on Machine Learning and Applications (ICMLA), Dec. 16, 2019, pp. 1415-1419.

Bai, et al., "SOD-MTGAN: Small Object Detection via Multi-Task Generative Adversarial Network," in 15th European Conference on Computer Vision, published in Lecture Notes in Computer Science, vol. 11217, Springer, Berlin, Heidelberg, Oct. 6, 2018, pp. 210-226.

Isola, et al., "Image-to-Image Translation with Conditional Adversarial Networks," in Proceedings of the 2017 IEEE Conference on Computer Vision and Pattern Recognition (CVPR), 2017, pp. 5967-5976.

Odena, Augustus, "Semi-Supervised Learning with Generative Adversarial Networks," arXiv:1606.01583v1 [stat.ML], Jun. 5, 2016, 3 pages.

Hobley, et al., "Say Yes to the Dress: Shape and Style Transfer Using Conditional GANs," in 14th Asian Conference on Computer

(56) References Cited

OTHER PUBLICATIONS

Vision, published in Lecture Notes in Computer Science, vol. 11363, Springer International Publishing, May 29, 2019, pp. 135-149.

Li, et al., "Boosting Fashion Image Attributes Classification Performance with MT-GAN Training Technique," 2020 IEEE 7th International Conference on Data Science and Advanced Analytics (DSAA), Oct. 2020, 10 pages.

Abdulnab, et al., "Multi-task CNN Model for Attribute Prediction," arXiv:1601.00400v1 [cs.CV], Jan. 4, 2016, 11 pages.

Caruana, Rich, "Multitask Learning," in Machine Learning 28, Kluwer Academic Publishers, 1997, pp. 41-75.

Yu, et al., "SeqGAN: Sequence Generative Adversarial Nets with Policy Gradient," in Proceedings of the Thirty-First AAAI Conference on Artificial Intelligence (AAAI-17), 2017, 7 pages.

Zhang, et al., "Adversarial Feature Matching for Text Generation," in Proceedings of the 34th International Conference on Machine Learning, PMLR 70, 2017, 10 pages.

Fedus, et al., "MaskGAN: Better Text Generation via Filling in the___," arXiv:1801.07736v3 [stat.ML], Mar. 1, 2018, 17 pages.

Radford, et al., "Unsupervised Representation Learning with Deep Convolutional Generative Adversarial Networks," arXiv:1511.06434v2 [cs.LG], Jan. 7, 2016, 16 pages.

Clark, et al., "ELECTRA: Pre-training Text Encoders as Discriminators Rather Than Generators," arXiv:2003.10555v1 [cs.CL], Mar. 23, 2020, 18 pages.

Liu, et al., "Representation Learning Using Multi-Task Deep Neural Networks for Semantic Classification and Infomnation Retrieval," in Proceedings of the 2015 Conference of the North American Chapter of the Association for Computational Linguistics: Human Language Technologies, 2015, pp. 912-921.

Collobert, et al., "Natural Language Processing (Almost) from Scratch," in Journal of Machine Learning Research 12, 2011, pp. 2493-2537.

Guo, et al., "Soft Layer-Specific Multi-Task Summarization with Entailment and Question Generation," in Proceedings of the 56th Annual Meeting of the Association for Computational Linguistics (vol. 1: Long Papers), Jul. 2018, pp. 387-697.

Choi, et al., "StarGAN v2: Diverse Image Synthesis for Multiple Domains," arXiv:1912.01865v2 [cs.CV], Apr. 26, 2020, 14 pages.

* cited by examiner

EXAMPLE APPLICATION A

EXAMPLE APPLICATION B

MULTI-TASK GAN, AND IMAGE TRANSLATOR AND IMAGE CLASSIFIER TRAINED THEREBY

BACKGROUND

A conditional generative adversarial networks (cGAN) includes a generator and a discriminator. The generator includes a first neural network that generates a synthetic image based on conditional input information. The discriminator includes a second neural network for determining whether an input image fed to it is synthetic (meaning that it was produced by the generator) or real (meaning that it was likely not produced by the generator). A training system iteratively adjusts the parameter values of the generator with the aim of producing synthetic images that are mistaken by discriminator as being real. The training system updates the parameter values of the discriminator such that it can successfully discriminate between synthetic and real images. This training objective is referred to as adversarial because it pits the generator against the discriminator. Once the generator and the discriminator are fully trained, a developer will use the generator to transform images from an input form into an output form. At this stage, the discriminator is not needed and is discarded.

GAN technology has proven to be a powerful tool to train image translators. For instance, the technical literature has discussed the use of GAN-trained image translators that allow users to modify fashion-related images. Yet there is room for improvement in existing GANs. For instance, a developer may have difficulty obtaining sufficient training data to train robust models using a GAN.

SUMMARY

A computer-implemented technique is described herein that uses a generative adversarial network (GAN) to jointly train a generator neural network ("generator") and a discriminator neural network ("discriminator"). Unlike traditional GAN designs, the discriminator performs the dual role of: (a) determining plural attribute values associated with an object depicted in an input image fed to the discriminator; and (b) determining whether the input image fed to the discriminator is real or "fake" (meaning that it is synthesized by the generator).

Also unlike traditional GAN designs, an inference-stage image classifier can make use of a model that is learned for the GAN's discriminator. In other words, the GAN produces two productive models. The first trained model finds use in an image translator, while the second trained model finds use in an image classifier. The GAN is referred to as a multi-task GAN herein because it incorporates a discriminator that performs plural tasks, including determining plural attribute values and determining whether the input image fed to the discriminator is real or fake. Another reason that the GAN can be referred to as multi-task is because it uses a same training procedure to produce two models.

According to one technical advantage, the GAN described herein can increase the accuracy of its trained models by including a discriminator that performs plural tasks. More specifically, the inclusion of a dual-use discriminator enables the generator to produce more realistic synthesized images, and enables the discriminator to perform its dual classification role with greater accuracy. This is true even for the case in which the GAN is trained using a relatively modest-sized corpus of training examples.

According to one illustrative aspect, the generator receives generator input information that includes a conditional input image and one or more conditional input values that express desired characteristics of a generator output image. In one non-limiting case, the conditional input image is produced by applying a predetermined image transformation on a given input image (e.g., a real image). The discriminator receives the conditional input image in conjunction with a discriminator input image, which corresponds to either the generator output image or a real image.

The above-summarized technique can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

Figure 1:
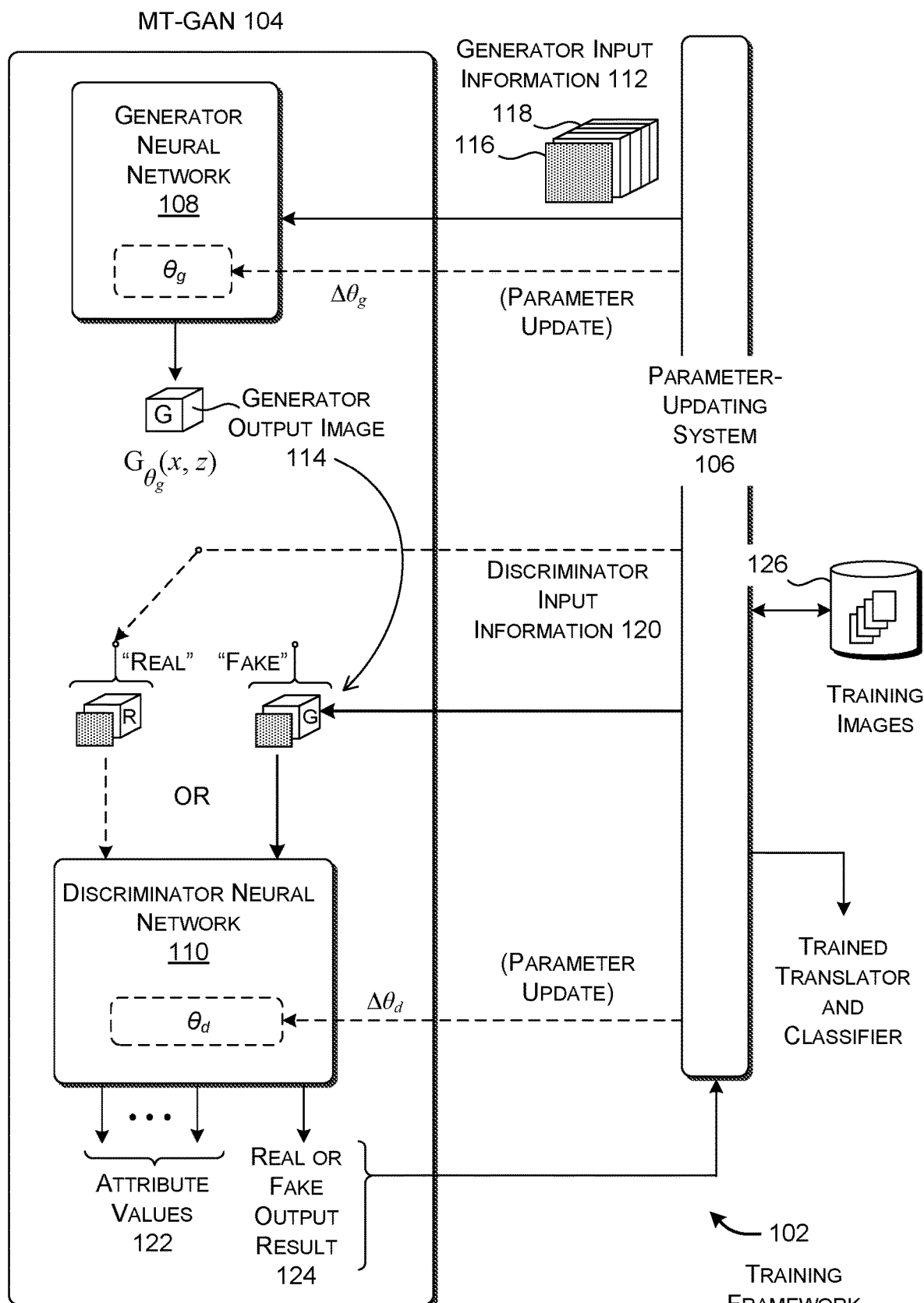
FIG. 1 shows a training framework that includes a generative adversarial network (GAN). The GAN, in turn, includes a generator neural network ("generator") and a discriminator neural network ("discriminator").

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes a GAN-based training framework for jointly training an image translator and an image classifier. Section B sets forth illustrative methods which explain the operation of the training framework of Section A. And Section C describes illustrative computing functionality that can be used to implement any aspect of the features described in Sections A and B.

As a preliminary matter, the term "hardware logic circuitry" corresponds to technology that includes one or more hardware processors (e.g., CPUs, GPUs, etc.) that execute machine-readable instructions stored in a memory, and/or one or more other hardware logic units (e.g., FPGAs) that perform operations using a task-specific collection of fixed and/or programmable logic gates. Section C provides additional information regarding one implementation of the hardware logic circuitry. In some contexts, each of the terms "component," "engine," "system," and "tool" refers to a part of the hardware logic circuitry that performs a particular function.

In one case, the illustrated separation of various parts in the figures into distinct units may reflect the use of corresponding distinct physical and tangible parts in an actual implementation. Alternatively, or in addition, any single part illustrated in the figures may be implemented by plural actual physical parts. Alternatively, or in addition, the depiction of any two or more separate parts in the figures may reflect different functions performed by a single actual physical part.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). In one implementation, the blocks shown in the flowcharts that pertain to processing-related functions can be implemented by the hardware logic circuitry described in Section C, which, in turn, can be implemented by one or more hardware processors and/or other logic units that include a task-specific collection of logic gates.

As to terminology, the phrase "configured to" encompasses various physical and tangible mechanisms for performing an identified operation. The mechanisms can be configured to perform an operation using the hardware logic circuitry of Section C. The term "logic" likewise encompasses various physical and tangible mechanisms for performing a task. For instance, each processing-related operation illustrated in the flowcharts corresponds to a logic component for performing that operation. A logic component can perform its operation using the hardware logic circuitry of Section C. When implemented by computing equipment, a logic component represents an electrical element that is a physical part of the computing system, in whatever manner implemented.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific term "computer-readable storage medium" expressly excludes propagated signals per se, while including all other forms of computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Further, the term "plurality" refers to two or more items, and does not necessarily imply "all" items of a particular kind, unless otherwise explicitly specified. Unless otherwise noted, the descriptors "first," "second," "third," etc. are used to distinguish among different items, and do not imply an ordering among items. Finally, the terms "exemplary" or "illustrative" refer to one implementation among potentially many implementations.

A. Illustrative Computing Systems

A.1. Overview

FIG. 1 shows a training framework 102 that includes a generative adversarial network (GAN) 104 in conjunction with a parameter-updating system 106. The GAN 104 includes a generator neural network ("generator") 108 and a discriminator neural network ("discriminator") 110. The generator 108 operates by transforming generator input information 112 into a generator output image 114. In one implementation, the generator input information 112 includes two parts. The first part is a conditional input image 116. A second part specifies one or more conditional attribute values 118. Additional information regarding the generator input information 112 is set forth below in conjunction with the description of FIG. 2.

The discriminator 110 receives discriminator input information 120. The discriminator input information 120 includes the same conditional input image 116 that was fed to the generator 108. It also includes a discriminator input image. The discriminator input image can either correspond to the generator output image 114 or a "real" image, which, in one interpretation, means any kind of input image produced by an mechanism (e.g., a camera), provided that the input image that was not synthetically generated by the generator 108. The real image is the real or source counterpart of the generator output image 114.

The discriminator 110 performs two tasks based on the discriminator input information 120. As a first task, the discriminator 110 generates one or more attribute values 122 that identify one or more characteristics of the discriminator input image included in the discriminator input information 120. That is, each attribute value specifies a class associated with a particular attribute of the discriminator input image. For example, the attribute value "red" specifies a class associated with the attribute of "color." As a second task, the discriminator 110 generates an output result 124 that specifies whether the discriminator input image is fake (meaning that it was likely generated by the generator 108) or real (meaning that it was not likely generated by the generator 108). In contrast, note that a traditional discriminator of a GAN performs the sole dedicated task of determining whether input information fed into the discriminator is real or fake. The discriminator 110 may be referred to as a multi-task discriminator because it performs at least the above two tasks. It may also be considered a multi-task discriminator because it classifies plural characteristics of the discriminator input image.

The behavior of the generator is governed by a set of parameter values $\theta_g$, while the behavior of the discriminator 110 is governed by a set of parameter values $\theta_d$. The parameter-updating system 106 iteratively adjusts these parameter values based on the following competing objectives. As a first objective, the parameter-updating system 106 attempts to iteratively adjust the parameter values of the generator 108 such that it produces increasingly realistic synthetic images. A generator output image is deemed realistic when it successfully "fools" the discriminator 110 into identifying it as real, when, in fact, it is synthetic. A successful generator output image also exhibits desired attributes values, and further enables the discriminator 110 to correctly assess its properties. Second, the parameter-updating system 106 attempts to iteratively adjust the parameter values of the discriminator 110 to progressively increase the accuracy with which it: (a) classifies the attributes of the discriminator input image; and (b) assesses whether the discriminator input image is real or fake. In performing this training task, the parameter-updating system 106 draws from training images in a data store 126. FIG. 1 also shows that the parameter-updating system 106 can feed both real discriminator input images and fake discriminator input images to the discriminator 110, e.g., on an alternating basis and/or any other basis.

Once fully trained, the parameter values $\theta_g$ of the generator 108 define a first trained model, while the parameter values $\theta_d$ of the discriminator 110 define a second trained model. In the inference stage, an image translator (not shown in FIG. 1) can use the first trained model to map translator input information into a translator output image. An image classifier (not shown in FIG. 1) can use the second trained model to identify one or more attributes values associated with a classifier input image, and to determine whether the classifier input image is real or fake. Note that, unlike a traditional GAN, the second trained model (associated with the discriminator 110) is productively employed by an image classifier. That is, a traditional GAN only leverages the discriminator to train a generator model; thereafter, a developer will discard the discriminator's trained model.

The use of a multi-task discriminator 110 imposes additional constraints in the training performed by the training framework 102, compared to a traditional GAN. These added constraints result in the production of a more accurate generator model and a more accurate discriminator model (compared to the example in which the discriminator 110 does not perform multiple tasks). The conditional input image fed to the discriminator 110 also passes on useful information to the discriminator 110, which contributes to the end result of producing an accurate discriminator model. FIG. 1 indicates that the GAN 104 may be referred to as a multi-task GAN, or MT-GAN for brevity. The GAN 104 is considered a multi-task GAN because it uses the above-described multi-task discriminator 110, and because it produces two productive models using the same training process.

From the standpoint of the discriminator 110, the generator 108 serves the role of expanding the number of training examples fed to the discriminator 110, starting from an original corpus of labeled source images. This factor is one reason the training framework 102 is able to produce robust models starting with a relatively modest corpus of training examples. Additional details regarding the training performed by the training framework 102 is set forth in Subsection A.4.

Figure 2:
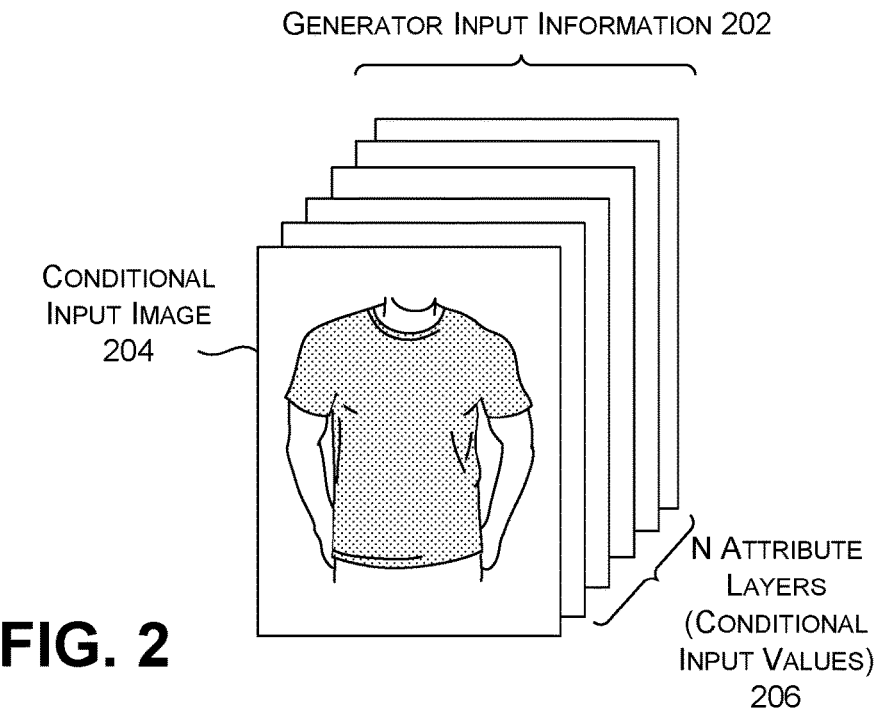
FIG. 2 shows an example of generator input information fed to the generator in FIG. 1.

FIG. 2 shows an example of generator input information 202 that may be fed to the generator 108. In one merely illustrative case, the generator input information 202 includes an f×g×1 conditional input image 204. Here, the conditional input image 204 is a grayscale image that shows a men's shirt, such as a 256×256×1 grayscale image. An input-preparing component (not shown in FIG. 2) can produce the conditional input image 204 by applying any type of transformation to a given original image, also referred to as a source image herein. In one non-limiting example, the given original image may correspond to a "real" red-green-blue (RGB) image, e.g., corresponding to an image taken by a camera. The transformation can modify the original image in any way, providing that the modification is consistently applied to all of the original images. As described below, in the inference stage, an image translator system also applies the same transformation.

The generator input information 202 also includes one or more attribute arrays 206. Each attribute array specifies an attribute value associated with an attribute. For example, a first attribute array specifies a particular color, a second attribute array specifies a particular pattern, a third attribute array specifies a particular material, and so on. More specifically, each attribute array has a size of f×g×1. Each element of an array specifies the same attribute value. Consider, for example, the attribute array associated color. Assume that there are M color classes, and that red is the $m^{th}$ color in a list of the M color classes. An attribute array for the color red can include the same value m/M across its 256×256×1 elements.

In general, the generator 108 seeks to produce a generator output image 114 that embodies the characteristics of both the conditional input image 202 and the conditional input value(s). For instance, the generator 108 seeks to produce a red-green-blue (RGB) generator output image that resembles the men's shirt in the conditional input image 204, and which embodies the attribute values specified in the attribute arrays. In one case, the generator output image 114 has a size of f×g×3, e.g., 256×256×3.

Figure 3:
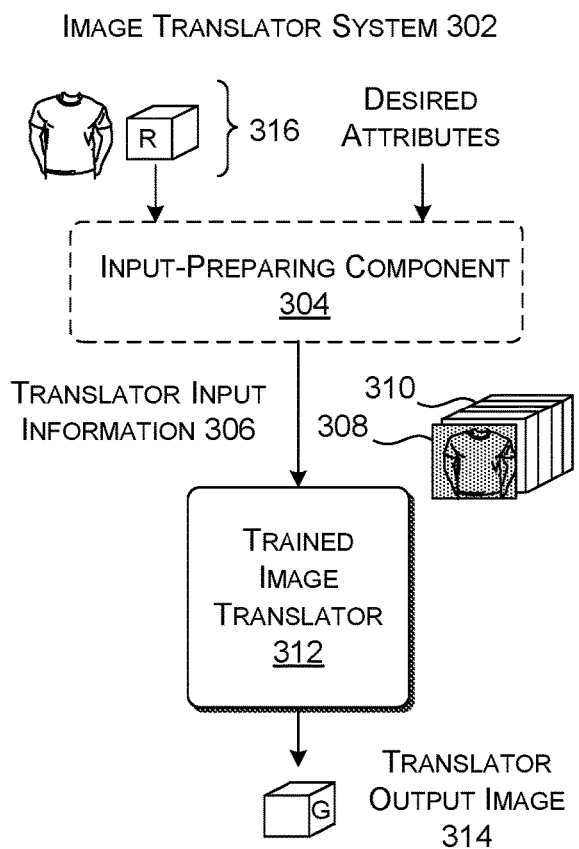
FIG. 3 shows an example of an image translator system that includes a trained image translator produced by the training framework of FIG. 1.

FIG. 3 shows one implementation of an image translator system 302 for use in the inference stage of operation. An input-preparing component 304 generates translator input information 306. The translator input information 306 conforms to the same type of input information fed to the generator 108. It includes a conditional input image 308 and one or more conditional input values 310. A trained image translator 312 embodies the model that was trained for the generator 106 in the GAN 104. The image translator 312 maps the translator input information 306 into a translator output image 314.

As described above, the input-preparing component 304 can produce the conditional input image 308 by applying any type of transformation to an original input image. In one non-limiting example, the input-preparing component 304 can apply any type of edge-preserving filter on a real image 316 to produce the conditional input image 308, such as a bilateral filter, anisotropic diffusion filter, an edge-preserving domain transform filter, and so on. A non-limiting example of a domain transform filter is described in Gastal, et al., "Domain Transform for Edge-Aware Image and Video Processing," in ACM Transactions on Graphics, Article No. 69, July 2011, 11 pages. In other cases, the input-preparing component 304 can apply a neural network that performs a style transformation of any type on the input image 316. A non-limiting example of a style transformation engine is described in Gatys, et al., "Image Style Transfer Using Convolutional Neural Networks," in 2016 IEEE Conference on Computer Vision and Pattern Recognition (CVPR), 2016, 10 pages.

Figure 4:
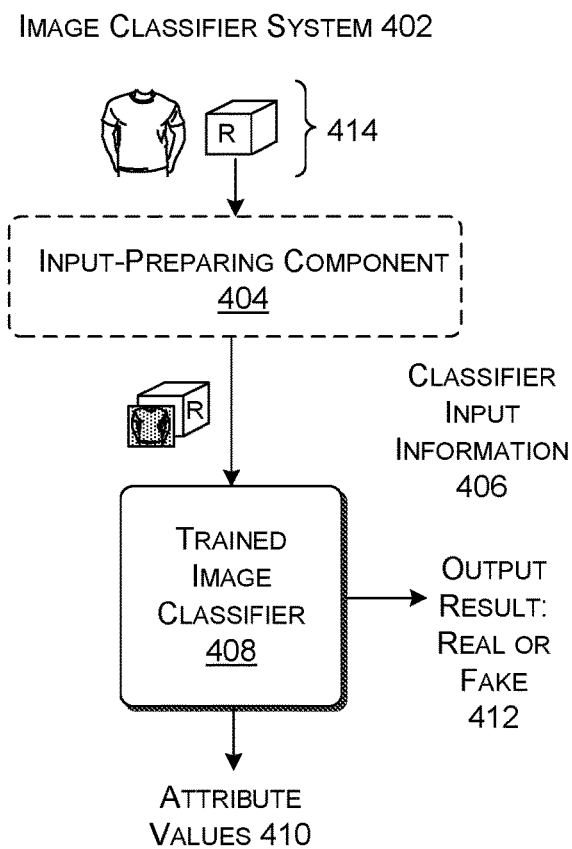
FIG. 4 shows an example of an image classifier system that includes a trained image classifier produced by the training framework of FIG. 1.

FIG. 4 shows one implementation of an image classifier system 402 for use in the inference stage of operation. An input-preparing component 404 generates classifier input information 406. The classifier input information 406 conforms to the same type input information fed to the discriminator 110. It includes a discriminator input image and a conditional input image. A trained image classifier 408 embodies the model that was trained for the discriminator 110 in the GAN 104. The image classifier 408 maps the classifier input information 406 into plural attribute values 410. It also maps the classifier input information 406 into an output result 412 that indicates whether the discriminator input image is real or fake. The input-preparing component 404 produces a conditional input image by applying the same type of transformation described above to a real image 414.

Figure 5:
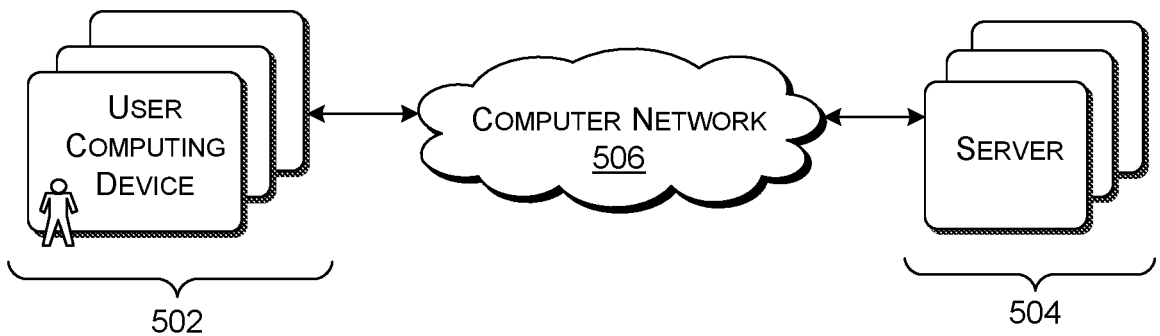
FIG. 5 shows computing equipment that can be used to implement any of the functionality of FIGS. 1, 3, and 4.

FIG. 5 shows computing equipment that can be used to implement the functionality of FIGS. 1, 3, and 4. The equipment includes plural user computing devices 502 that interact with one or more servers 504 via a computer network 506. The user computing devices 502 can include: any of desktop computing devices, laptop computing devices, handheld computing devices of any type (smartphones, tablet-type computing devices, etc.), game consoles, cable boxes, mixed-reality devices, wearable devices, etc. The computer network 506 may correspond to a wide area network (e.g., the Internet), a local area network, etc.

The training framework 102, image translator system 302, and image classifier system 402 can be distributed between user computing devices and the servers 504 in any manner. In one case, for instance, one or more servers implement the entirety of the training framework 102. Likewise, one or more servers can implement the image translator system 302 and the image classifier system 402. In other cases, any (or all) of these elements can be implemented by each user computing device in local fashion. In still other case, some of the functionality of these elements can be implemented by the servers 504 and some of the functionality of these elements can be implemented by individual user computing devices 502.

A.2. Illustrative Applications

Figure 6:
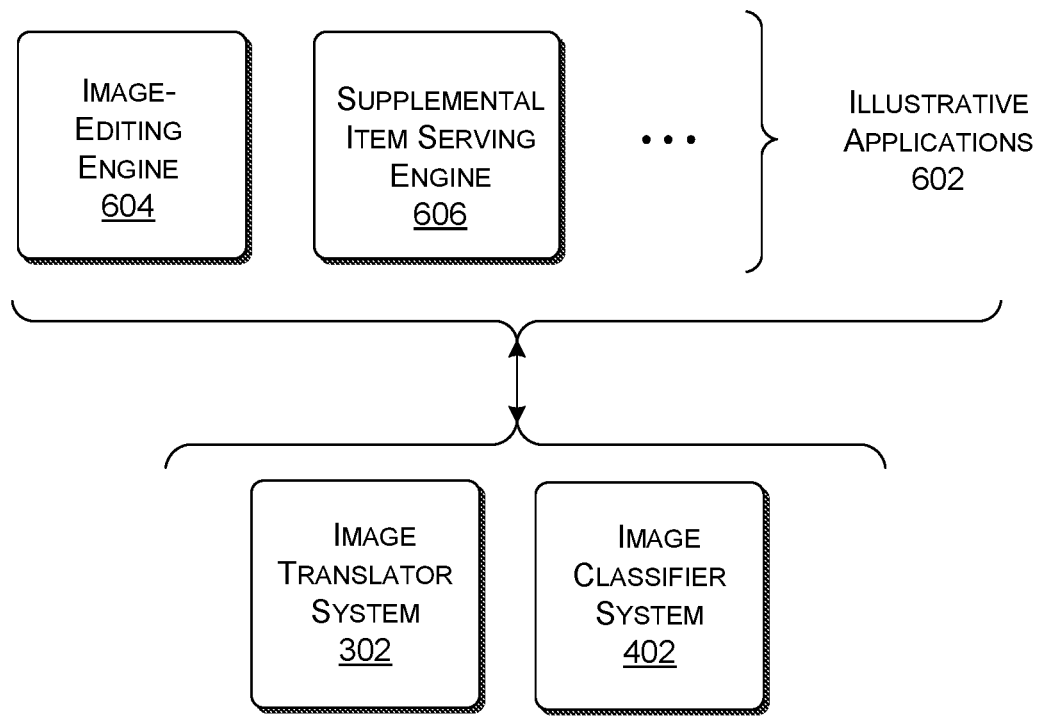
FIG. 6 shows various applications that can make use of the image translator system and/or the image classifier system of FIGS. 3 and 4, respectively.

FIG. 6 shows various applications 602 of the image translator system 302 and the image classifier system 402. An image-editing engine 604 enables a user to modify a specified input image. The image-editing engine 604 performs this task with the assistance of the image translator system 302 of FIG. 3. A supplemental item-serving engine ("item-serving engine") 606 sends a supplemental content item (such as a digital advertisement) to a user based on attribute values identified by the image classifier system 402 of FIG. 4. Any application can be distributed between the user computing devices 502 and the servers 504 in any manner described above.

Figure 7:
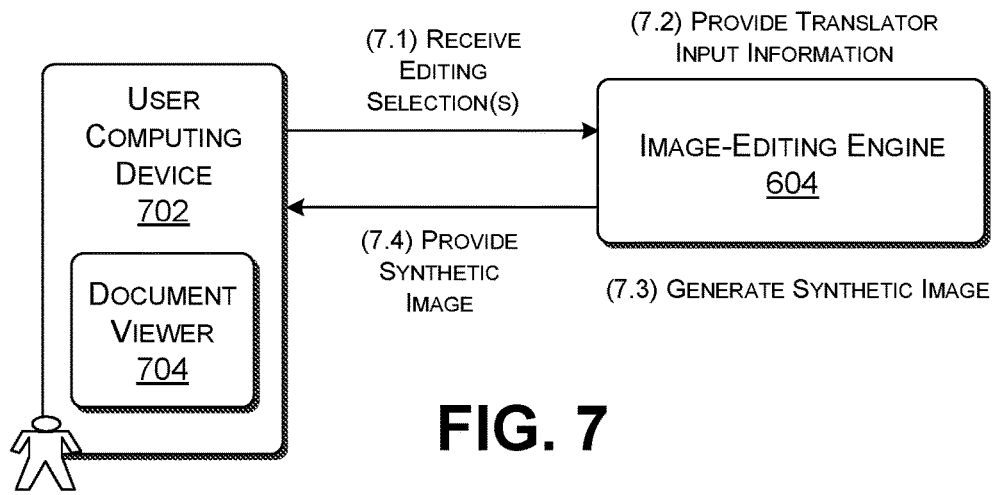
FIG. 7 shows one application of the image translator system of FIG. 3.

FIG. 7 provides further details regarding the image-editing engine 604. A user interacts with the image-editing engine 604 using a user computing device 702. The user computing device 702, in turn, includes a document viewer 704 that enables a user to interact with electronic documents. For example, the document viewer 704 may correspond to a browser that is locally implemented by the user computing device 702. The browser enables the user to view web pages hosted by one or more web sites.

The operation of the application shown in FIG. 7 will be described in conjunction with the electronic document 902 shown in FIG. 9. In operation 7.1, assume that the user loads the electronic document 902 that shows at least one input image 904. For instance, the user may click a link in the document viewer 704 that is associated with the electronic document 902. The document viewer 704 responds by displaying the electronic document 902 on a display device provided by the user computing device 702.

Figure 9:
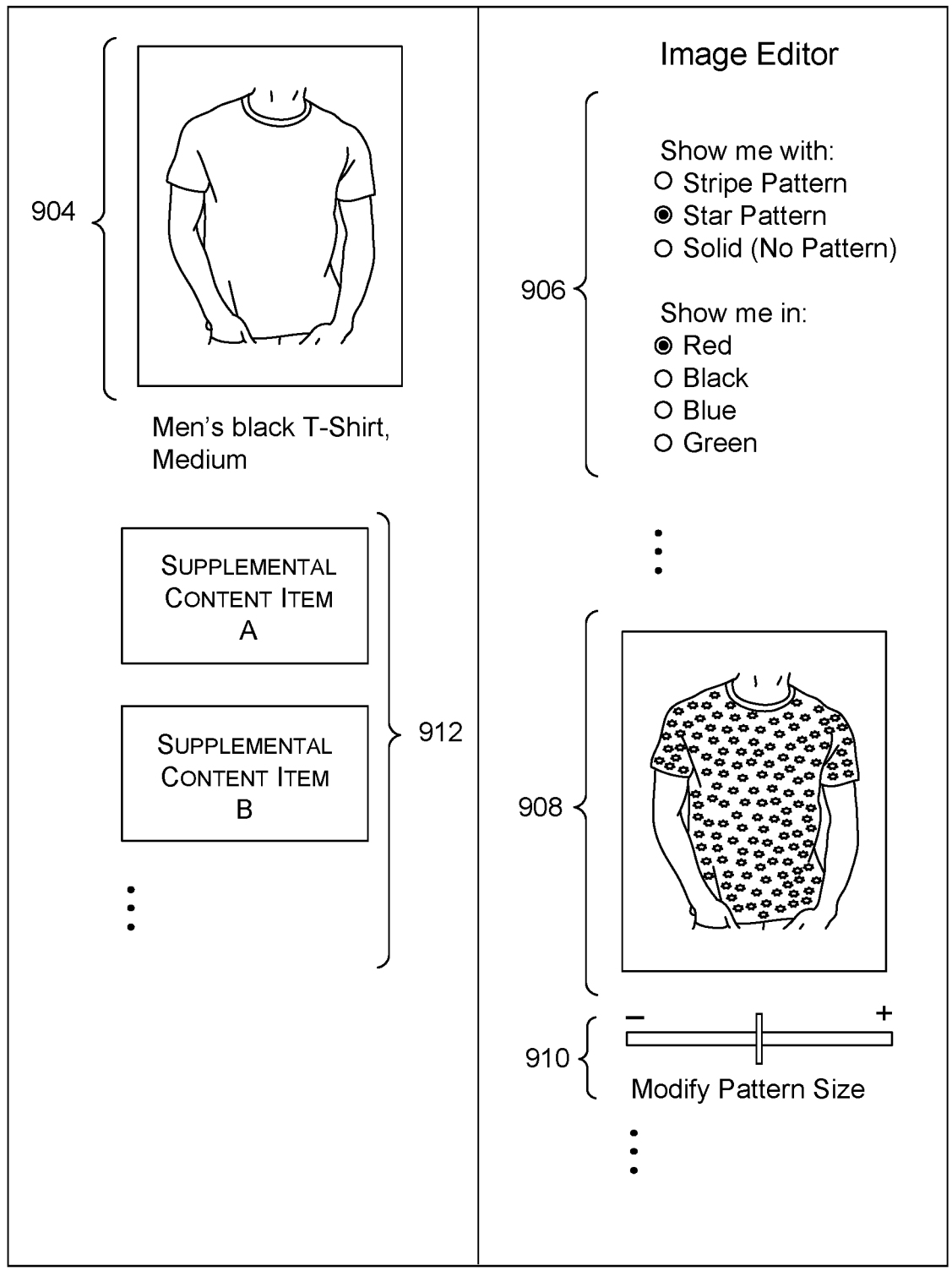
FIG. 9 shows an electronic document by which a user may interact with the applications of FIGS. 7 and 8.

In the merely illustrative case of FIG. 9, the electronic document 902 is a web page associated with an article of clothing. The input image 904 shows that piece of clothing. Here, the article of clothing is a T-Shirt. In other examples, the input image may show a fashion accessory (e.g., a purse), an item of furniture, an automotive item, etc. Further assume that the electronic document 902 presents at least one graphical control 906 that allows the user to manipulate the input image 904. The graphical control 906 in this example includes a set of radio buttons that allow the user to select attribute classes associated with two attributes (pattern and pattern color). Different implementations of the graphical control 906 can allow the user to select any number of attribute values. Further, different implementations of the graphical control 906 can use different respective graphical control mechanisms to receive the user's input. Assume that the user makes selections that indicate that he or she wishes to view the T-Shirt shown in the input image 904 in a star pattern, with red-colored stars.

In operation 7.1, the image-editing engine 604 receives input information that specifies one or more selections that the user has made using the graphical control 906. In operation 7.2, the image-editing engine 604 uses the input-preparing component 304 of the image translator system 302 to generate translator input information. More specifically, the input-preparing component 304 generates a conditional input image by applying a predefined image transformation to the input image 904 that appears in the electronic document 902 (assuming that the conditional input image has not already been generated and pre-stored). In the merely illustrative example of the figures, the input-preparing component 304 applies a transformation to produces a grayscale version of the input image 904, but many other kinds of transformations can be used. The input-preparing component 304 then generates one or more attribute values that encode the selections that the user has made via the graphical control 906. In operation 7.3, the image-editing engine 604 relies on the image translator 312 to map the translator input information to a translator output image 908. In operation 7.4, the image-editing engine 604 sends the translator output image 908 (or link thereto) to the user computing device 702. The document viewer 704 displays the translator output image 908 in the same electronic document 902 in which the input image 904 appears, although this need not be the case in all applications. The translator output image 908 shows a version of the T-Shirt depicted in the input image 904 with a red-star pattern.

An optional graphical control 910 corresponds to a slide bar that allows the user to adjust the size of the stars in the star pattern in the translator output image 908. That is, the user can increase the size of the stars by moving a sliding member of the slide bar to the right. In response, the image translator system 302 dynamically adjusts the translator output image 908. Other implementations can provide dynamic control in different ways, such by including additional slide bars associated with additional attributes.

Figure 8:
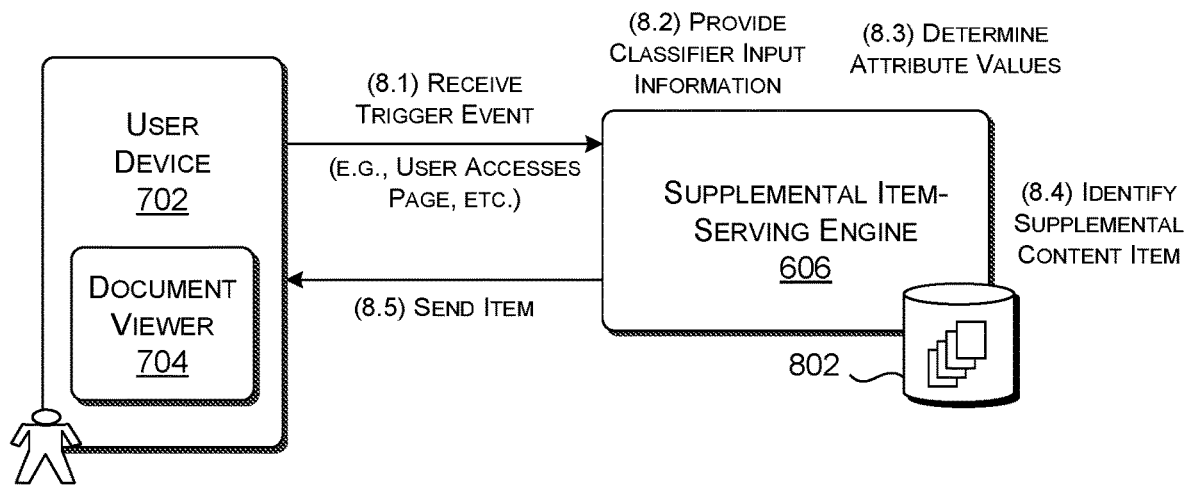
FIG. 8 shows one application of the image classifier system of FIG. 4.

FIG. 8 provides further details regarding one manner of operation of the supplemental item-serving engine 606 ("item-serving engine" for brevity). This figure will also be explained in the context of the electronic document 902 shown in FIG. 9 (although the item-serving engine 606 and the item-editing engine 604 can also be used separately). Again assume that the user loads the electronic document 902 for viewing on the document viewer 704. Again assume that the electronic document 902 includes an input image 904 of an item of clothing, here, a T-Shirt.

In operation 8.1, the item-serving engine 606 receives a trigger event that indicates that the user has invoked its services. In this case, the trigger event corresponds to a determination that the user has loaded the electronic document 902 which includes the input image 904. In operation 8.2, the item-serving engine 606 relies on the input-preparing component 404 of the image classifier system 402 to generate classifier input information. The classifier input information includes the input image 904 and a transformed version of the input image 904. Again, the input-preparing component 404 produces a grayscale version of the input image 904 (if not already generated and pre-stored), but other implementations can use other types of transformations. In operation 8.3, based on the translator input information, the image classifier 408 generates plural attribute values associated with the input image 904. These attribute values describe respective properties of the T-Shirt depicted in the input image 904. For example, one attribute value may describe a particular color of the T-Shirt, another attribute value may specify the T-Shirt's manufacturer, another attribute value may specify the T-Shirt's material, another attribute value may specify the T-Shirt's pattern, and so on. The image classifier 408 also generates an output result that indicates whether the input image 904 is real or fake. This information is an artifact of the fact that the image classifier 408 has been trained using the GAN 104 of FIG. 1. In this example, this output result can be ignored. But other applications may productively use this output result In operation 8.4, the item-serving engine 606 next identifies at least one supplemental content item based on the identified attributes. For example, assume that the item-serving engine 606 includes or has access to a data store 802 of supplemental content items, such as digital advertisements. Further assume that each supplemental content item in the data store 802 is tagged with metadata that describes its attribute values. The item-serving engine 606 can perform a search to find one or more supplemental content items in the data store 604 having attribute values that best match the attribute values of the input image 904. For example, the item-serving engine 606 can locate a digital advertisement that pertains to men's T-Shirts for sale by a particular manufacturer, where those T-Shirts include various patterns.

In operation 8.5, the item-serving engine 606 sends one or more supplemental content items (or URLs associated therewith) to the document viewer 704. FIG. 9 shows that the document viewer 704 displays two or more supplemental content items 912 on the electronic document 902. Each supplemental content item 912 can include at least hypertext link. A user may use the document viewer 704 to click on a hypertext link associated with a supplemental content item. This action will direct the user to a web page associated with the activated supplemental content item. For example, upon clicking on a hyperlink, the document viewer 704 may direct the user to a web page hosted by the sponsor of the supplemental content item, corresponding to a distributor of T-Shirts.

The above-described applications are set forth in the spirit of illustration, not limitation. Many other applications can make use of the image translator system 302 and the image classifier system 402 of FIGS. 3 and 4, respectively. For example, another application can rely on the attribute values generated by the image classifier system 402 to offer search suggestions to a user. Another application can rely on the attribute values generated by the image classifier system 402 to enhance a search query submitted by a user. Another application can use the output result generated by the image classifier system 402 that indicates whether the input image is real or fake to determine whether someone has altered an original input image, and so on.

A.3. The Generator and the Discriminator

This subsection sets forth illustrative details of the generator 108 and the discriminator 110. This section also indirectly describes the architecture of the image translator 312 and the image classifier 408, since the image translator 312 adopts the same architecture as the generator 108, and the image classifier 408 adopts the same architecture as the discriminator 110.

The generator 108 and the discriminator 110 can each include one or more convolutional neural networks (CNNs). Therefore, in advance of explaining illustrative architectures of the generator 108 and the discriminator 110, the principle features of an illustrative CNN 1002 will be described below with reference to FIG. 10.

Figure 10:
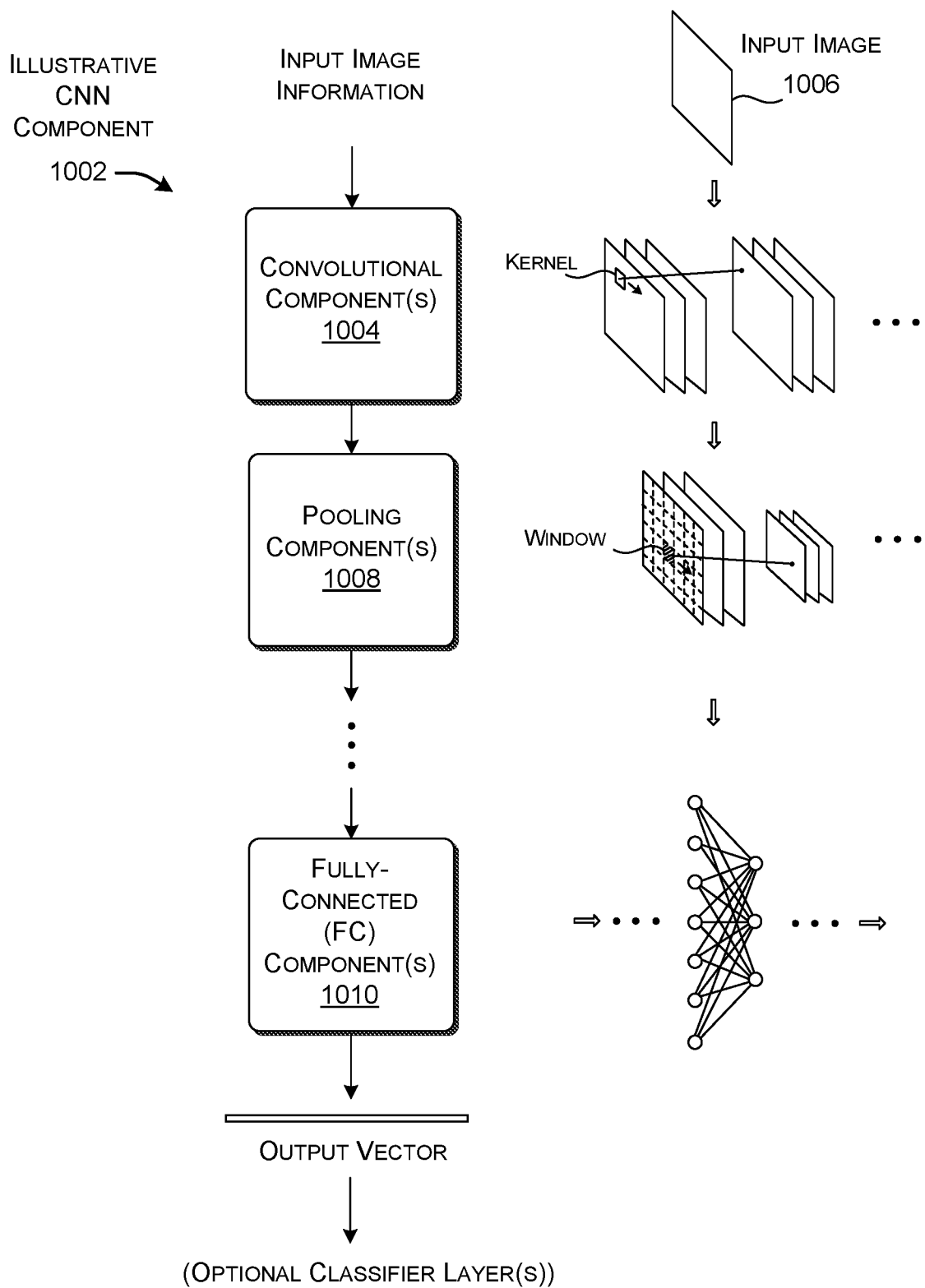
FIG. 10 shows an illustrative convolutional neural network (CNN). Different parts of the GAN of FIG. 1 can make use of one or more CNNs.

The CNN 1002 show in FIG. 10 performs analysis in a pipeline of stages. One of more convolutional components 1004 perform a convolutional operation on an input image 1006. One or more pooling components 1008 perform a down-sampling operation. One or more fully-connected components 1010 respectively provide one or more fully-connected neural networks, each including any number of layers. More specifically, the CNN 1002 can intersperse the above three kinds of components in any order. For example, the CNN 1002 can include two or more convolutional components interleaved with pooling components.

In each convolutional operation, a convolutional component moves an n×m kernel across an input image (where "input image" in this general context refers to whatever image is fed to the convolutional component). In some implementations, at each position of the kernel, the convolutional component generates the dot product of the kernel values with the underlying pixel values of the image. The convolutional component stores that dot product as an output value in an output image at a position corresponding to the current location of the kernel. More specifically, the convolutional component can perform the above-described operation for a set of different kernels having different machine-learned kernel values. Each kernel corresponds to a different pattern. In early layers of processing, a convolutional component may apply a kernel that serves to identify relatively primitive patterns (such as edges, corners, etc.) in the image. In later layers, a convolutional component may apply a kernel that finds more complex shapes (such as shapes that particular kinds of objects in the input image 1006, etc.).

In each pooling operation, a pooling component moves a window of predetermined size across an input image (where the input image corresponds to whatever image is fed to the pooling component). The pooling component then performs some aggregating/summarizing operation with respect to the values of the input image enclosed by the window, such as by identifying and storing the maximum value in the window, generating and storing the average of the values in the window, etc. A pooling operation may also be referred to as a down-sampling operation. Although not shown, a counterpart up-sampling component can expand an input image into a larger-sized output image, e.g., by duplicating values in the input image within the output image.

A fully-connected component is often preceded by a flattening component (not shown in FIG. 10). A flattening component compresses an input image (or images) into a single input vector. It can perform this task by concatenating the rows or columns of the input image (or images) to form a single input vector. The fully-connected component then processes the input vector using a fully-connected neural network. To compute the output value of any particular neuron in a particular layer of a fully-connected network, the neuron generates the weighted sum of the values of the preceding layer, optionally adds a bias value to the sum, and then applies an activation function to this result (such as the ReLU activation function or hyperbolic tangent function, etc.).

The last fully-connected layer of the CNN 1002 provides a final representation of features associated with the input image 1006. Although not shown, one or more classification components may operate on the features to generate output conclusions. For example, the CNN 1002 may include a softmax output operation, a support vector machine (SVM) classifier, etc.

Figure 11:
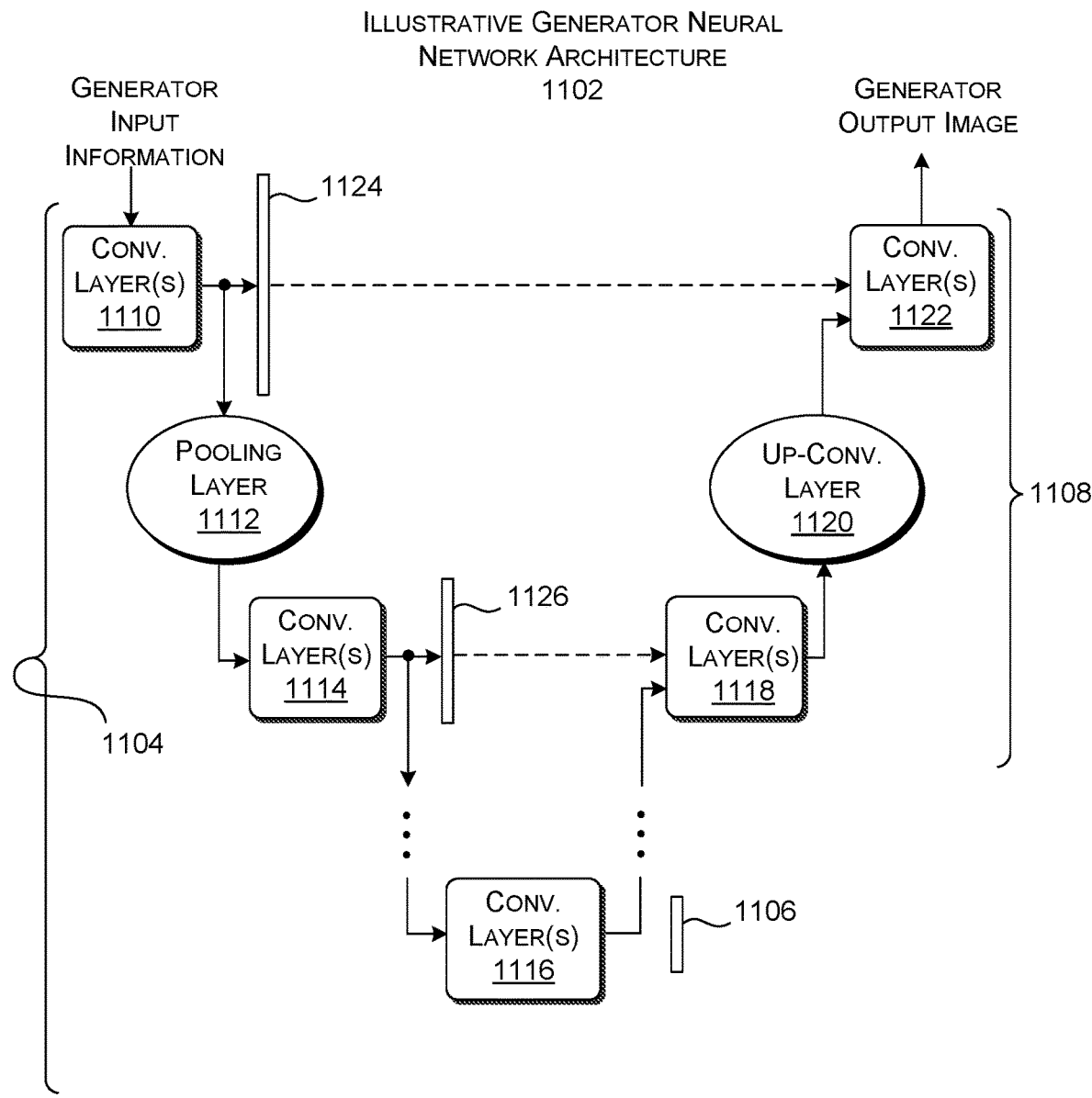
FIG. 11 shows one illustrative architecture that can be used to implement the generator in the GAN of FIG. 1.

FIG. 11 shows one illustrative architecture 1102 that can be used to implement the generator 108 in the GAN 104 of FIG. 1. At the outset, it should be pointed out that this architecture 1102 is presented in the spirit of illustration, not limitation. Other implementations can use other types of architectures. For example, another architecture (not shown) can use a recurrent neural network (RNN) to map generator input information into a generator output image. Another architecture can use a single CNN to map the generator input information to a generator output image.

The architecture 1102 shown in FIG. 11 includes a first series of convolutional layers and pooling layers 1104 that map the generator input information to a low-dimensioned representation 1106 of the generator input information. It includes a second series of convolutional layers and up-converting layers 1108 that map the low-dimensioned representation 1104 of the generator input information into the generator output image. The first series of layers 1104 forces the architecture 1102 to learn the most salient features of the generator input information. From a more encompassing standpoint, the first series of layers 1104 may be regarded as a down-sampling component, while the second series of layers 1108 may be regarded as an up-converting component.

In addition, the first series of layers 1104 feeds feature information to like-dimensioned layers in the second series of layers 1108. This feeding of information across the like-dimensioned layers has the resultant effect of preserving fine-detailed information that would otherwise be lost by down-sampling the generator input information into the low-dimensioned representation 1106.

In the specific example of FIG. 11, the first series of layers 1104 includes one or more convolutional layers 1110, a pooling layer 1112, one or more convolutional layers 1114, one or more convolutional layers 1116, etc. The second series of layers 1108 includes one or more convolutional layers 1118, an up-converting layer 1120, one or more convolutional layers 1122, etc. The architecture 1102 feeds feature information 1124 generated by the convolutional layer(s) 1110 as input to the like-dimensioned convolutional layer(s) 1122. The architecture 1102 feeds feature information 1126 generated by the convolutional layer(s) 1114 as input to the like-dimensioned convolutional layer(s) 1118, and so on.

Figure 12:
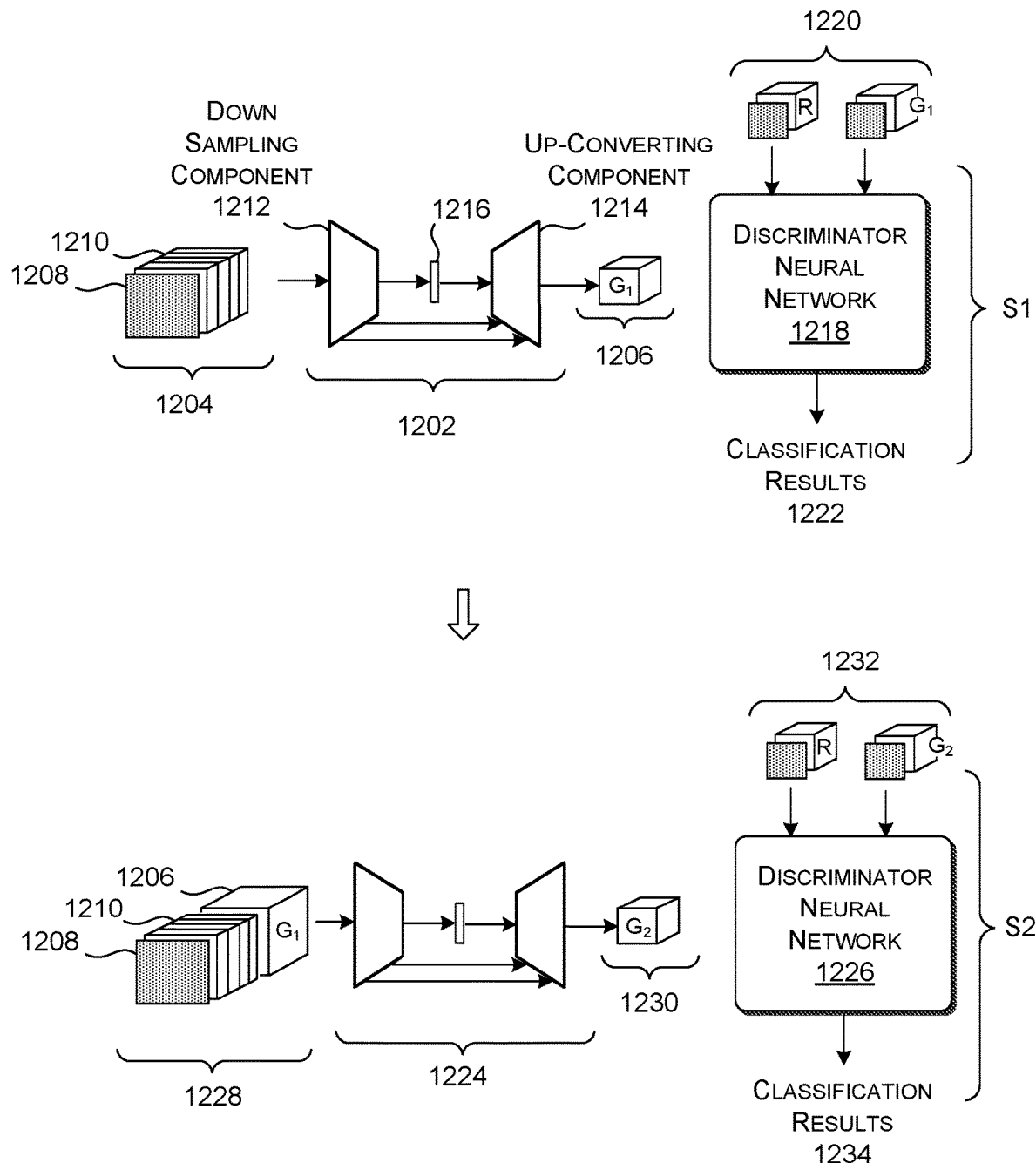
FIG. 12 shows a dual-stage configuration for applying the GAN of FIG. 1.

FIG. 12 shows a dual-stage configuration for applying the generator of FIG. 11. The training framework 102 performs training using just the first stage for a prescribed number of training cycles. It then performs training using a second stage for additional training cycles, leveraging the results of the first stage as a starting point. The second stage refines the models produced in the first stage. Alternatively, the training framework 102 only performs training using the first stage.

In the first stage (S1), a generator 1202 maps generator input information 1204 into a generator output image $G_1$ 1206. The generator input information 1204 includes a conditional input image 1208 and one or more conditional input values 1210. The generator 1202 itself includes a down-sampling component 1212 that corresponds to the first series of layers 1104 shown in FIG. 11, and an up-converting component 1214 that corresponds to the second series of layers 1108 shown in FIG. 11. The down-sampling component 1212 converts the generator input information 1204 to a latent representation 1216, and the up-converting component 1214 converts the latent representation 1216 to the generator output image $G_1$ 1206. A discriminator 1218 maps discriminator input information 1220 into the same kind of classification results 1222 described above with reference to FIG. 1. The discriminator input information 1220 can include a conditional input image in combination with either the generator output image $G_1$ 1206 or real counterpart of the generator output image $G_1$ 1206.

In an optional second phase of training (S2), the output of the first phase of training can be applied as input to the second phase of training. The second phase of training has the end effect of further improving the quality of the trained models produced by the GAN 104. The second phase of training uses a second-stage generator 1224 in combination with a second-stage discriminator 1226. The second-stage generator 1224 is adapted to accept different generator input information compared to the first-stage generator 1202, but is otherwise like the first-stage generator 1202. The second-stage generator 1224 begins its training without reference to the trained parameter values learned in the first phase. The second-stage discriminator 1226 has the same architecture as the first-stage discriminator 1218; unlike the generator 1224, the second-stage discriminator 1226 begins its training using the model parameter values learned in the phrase phase.

More specifically, in the second phase, the second-stage generator 1224 maps generator input information 1228 that includes the generator output image $G_1$ 1206 generated by the first phase into a generator output image $G_2$ 1230. The generator input information 1228 also includes the same conditional input image 1208 and the conditional input values 1210 that were fed to the first-stage generator 1202 in the first phase. The second-stage discriminator 1226 again maps discriminator input information 1232 into classification results 1234. The discriminator input information 1232 includes a conditional input image and either the generator output image $G_2$ 1230 or the real counterpart thereof.

If only the first stage is used to train the models, the inference-stage image translator 312 (of FIG. 3) will use just the model learned by the first-stage generator 1202. The inference-stage image classifier 408 will use the model learned by the first-stage discriminator 1218. But if both the first stage and the second stage are used to train the models, the inference-stage image translator 312 will use a cascaded combination of models provided by the first-stage generator 1202 and the second-stage generator 1224. The inference-stage image classifier 408 will use the model learned by the second-stage discriminator 1226.

Figure 13:
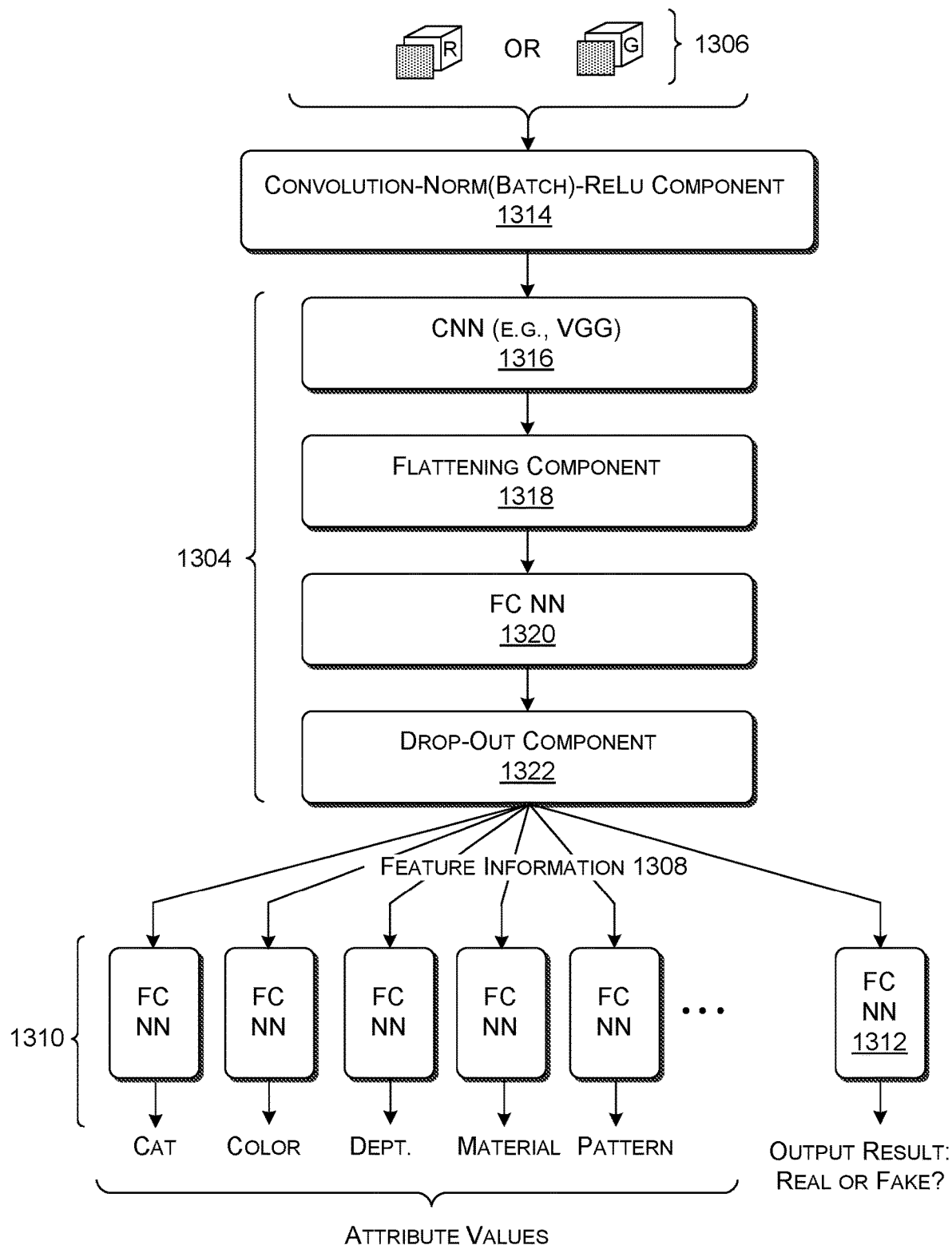
FIG. 13 shows one illustrative architecture that can be used to implement the discriminator in the GAN of FIG. 1.

FIG. 13 shows one illustrative architecture 1302 that can be used to implement the discriminator 110 in the GAN of FIG. 1. The discriminator 110 includes a convolutional neural network (CNN) 1304 that maps discriminator input information 1306 into feature information 1308. That is, the final layer of the CNN 1304 produces an output vector that provides the feature information 1308. Plural individual fully-connected neural networks 1310 map the feature information 1308 into plural respective attribute values. Each such fully-connected neural network can have any number of layers and can adopt any activation function (e.g., ReLU). Another fully-connected neural network 1312 maps the feature information 1308 into an output result that indicates whether the discriminator input image in the discriminator input information 1306 is real or fake.

The CNN 1304 can include any implementation-specific combination of components. A first component 1314 can apply a convolutional operation, a batch normalization operation, and a ReLU operation in that order. The first component 1314 also has the effect of down-converting the four-channel discriminator input information 1306 into three-channel information for further processing by the remainder of the CNN 1304. (The input to the first component 1314 is four channels because it includes a one-channel grayscale conditional input image and a three-channel red-green-blue discriminator input image.) Another convolutional neural network (CNN) 1316 performs further processing on the information fed to it by the first component 1314. In one implementation, the CNN 1316 may use the architecture of the VGG neural network described in Simonyan, et al., "Very Deep Convolutional Networks for Large-Scale Image Recognition," arXiv:1409.1556v6 [cs.CV], Apr. 10, 2015, 14 pages, although any other neural network can be used to implement the CNN 1316. A flattening component 1318 converts the output information provided by the CNN 1316 into a single output vector. A fully-connected neural network 1320 performs further processing on the flatted output vector using one or more fully-connected layers that adopt any activation function (e.g., ReLU). An optional drop-out component 1322 selectively ignores or "drops out" output values produced by the fully-connected neural network 1320. This well-known drop-out operation helps reduce overfitting during the training operation.

A.4. Training Environment

Figure 14:
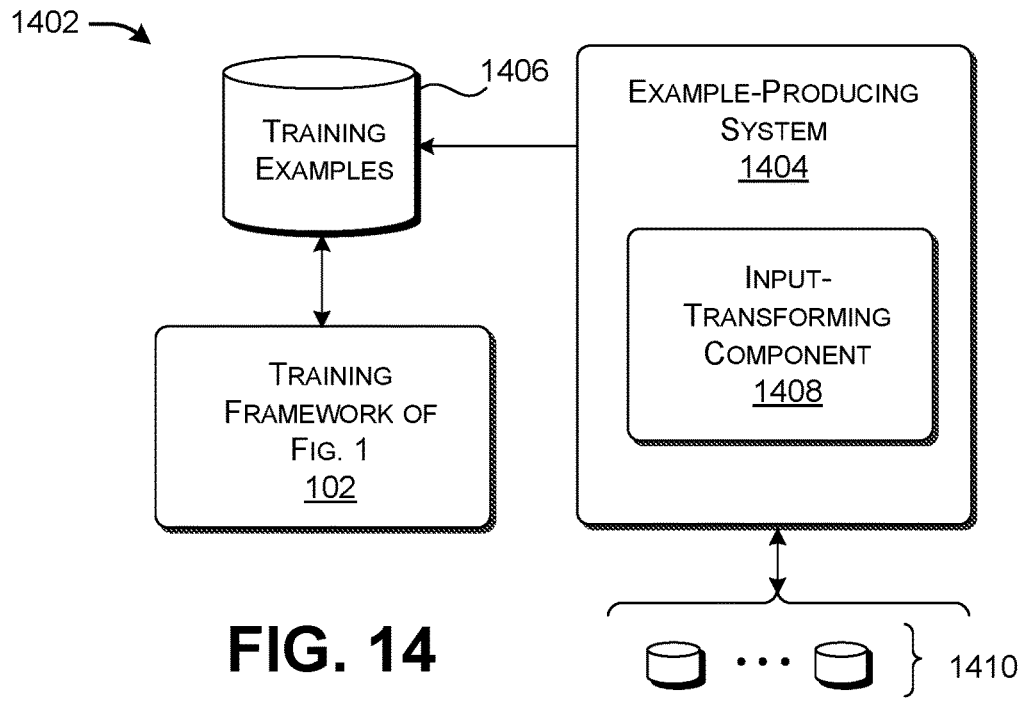
FIG. 14 shows a training environment that includes the training framework of FIG. 1.

FIG. 14 shows a training environment 1402 that includes the training framework 102 of FIG. 1. The training environment 1402 includes an example-producing system 1404 that generates a set of input training examples. A data store 1406 stores the input training examples. Each input training example incudes: (a) a source image; (b) a transformed image associated with the source image; and (c) attribute values associated with the source image that describe its characteristics. In one implementation, the example-producing system 1404 can rely on an image-transforming component 1408 to generate a transformed image for each given source image. In the examples described herein, the image-transforming component 1408 performs this task by producing a grayscale representation of an input RGB source image. But the image-transforming component 1408 can modify the source images in any manner, providing that the modification is consistently applied to all of the source images. The example-producing system 1404 can receive its source images from one or more source repositories 1410. Assume that at least one source includes a plurality of source images having labels that define the characteristics of objects depicted in the source images. From a high-level perspective, the image-transforming component 1408 provides a convenient mechanism for producing pairs of source and transformed images, which would otherwise be difficult to obtain in direct fashion from the source repositories 1410 (because relatively few applications natively produce pairs of source and transformed images, where those source images also include labels that describe their properties).

In general, the training environment 1402 is capable of producing robust models based on a relatively modest corpus of training examples. This characteristic ensues, in part, from the multi-task nature of the training performed by the training framework 102. That is, the multi-tasking training imposes additional constraints that have the result of extracting additional insight from the training examples.

Further, the generator 108 serves the role of expanding the number of training examples fed to the discriminator 110, starting from an original corpus of labeled source images. For example, the generator 108 can modify a source image of a pair of red shoes in many different ways by feeding a conditional input image associated with this source image, together with different conditional input values. The conditional input values, for instance, may specify shoes of different colors, textures, etc. This is another reason why the training environment 1402 can be said to produce robust models starting with a relatively modest corpus of training examples.

The parameter-updating system 106 of the training framework 102 can iteratively update the parameter values of the GAN 104 based on the following loss function:

$$\mathcal{L}(G,D) = \mathbb{E}_{x,y}[\log(\text{mask} \cdot D(x,y))] + \mathbb{E}_{x,z}[\log(1 - \text{mask} \cdot D(x, G(x,z)))] + \lambda \mathbb{E}_{x,y,z}[\|y - G(x,z)\|_1].$$

In this equation, the generator (G) 108 maps an observed image x and random noise vector z to an output image y. The generator 108 is trained to generate an output image that cannot be distinguished from real images by the discriminator (D) 110. The discriminator 110, in turn, is optimized to discriminate between the synthetized and real images. In other words, the generator 108 attempts to minimize the objective in the above equation, while the discriminator 110 attempts to maximize it. The third line of the above equation reduces blurring by requiring the generator 108 to produce output images that are close to respective ground-truth outputs. This portion of the equation uses the L1 distance ($l_1$) to express this goal. $\lambda$ is a weighting factor that governs the impact that the anti-blurring objective plays in the training performed by the training framework 102. Finally, mask is a tensor of the same shape as D(x,y) with binary values 0 and 1. A value is 1 indicates that a corresponding label exists. This mask tensor has the end result of counting only labels that are available in the course of the training operation.

B. Illustrative Processes

FIGS. 15-18 show processes that explain the operation of the training framework 102 and the resultant trained image translator system 302 and the image classifier system 402 of Section A in flowchart form. Since the principles underlying the operation of these elements have already been described in Section A, certain operations will be addressed in summary fashion in this section. As noted in the prefatory part of the Detailed Description, each flowchart is expressed as a series of operations performed in a particular order. But the order of these operations is merely representative, and can be varied in any manner.

Figure 15:
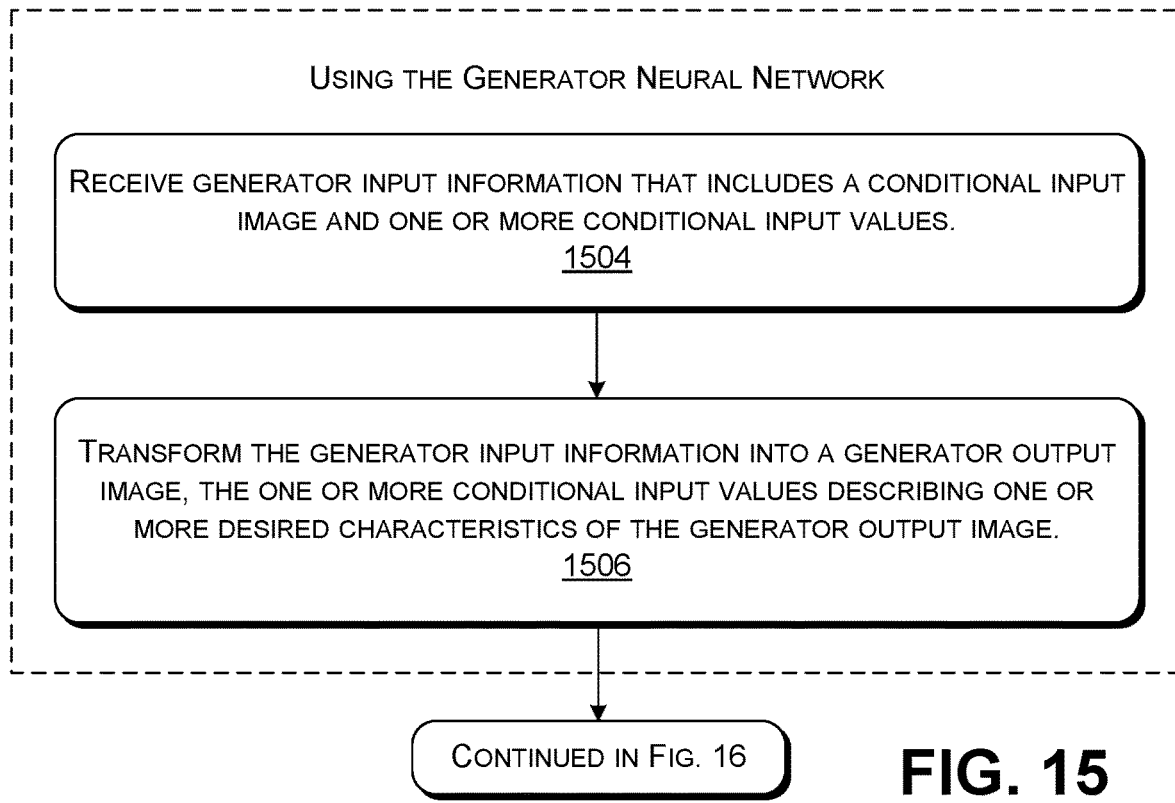
FIGS. 15 and 16 together show a process that describes one manner of operation of the GAN of FIG. 1.
Figure 16:
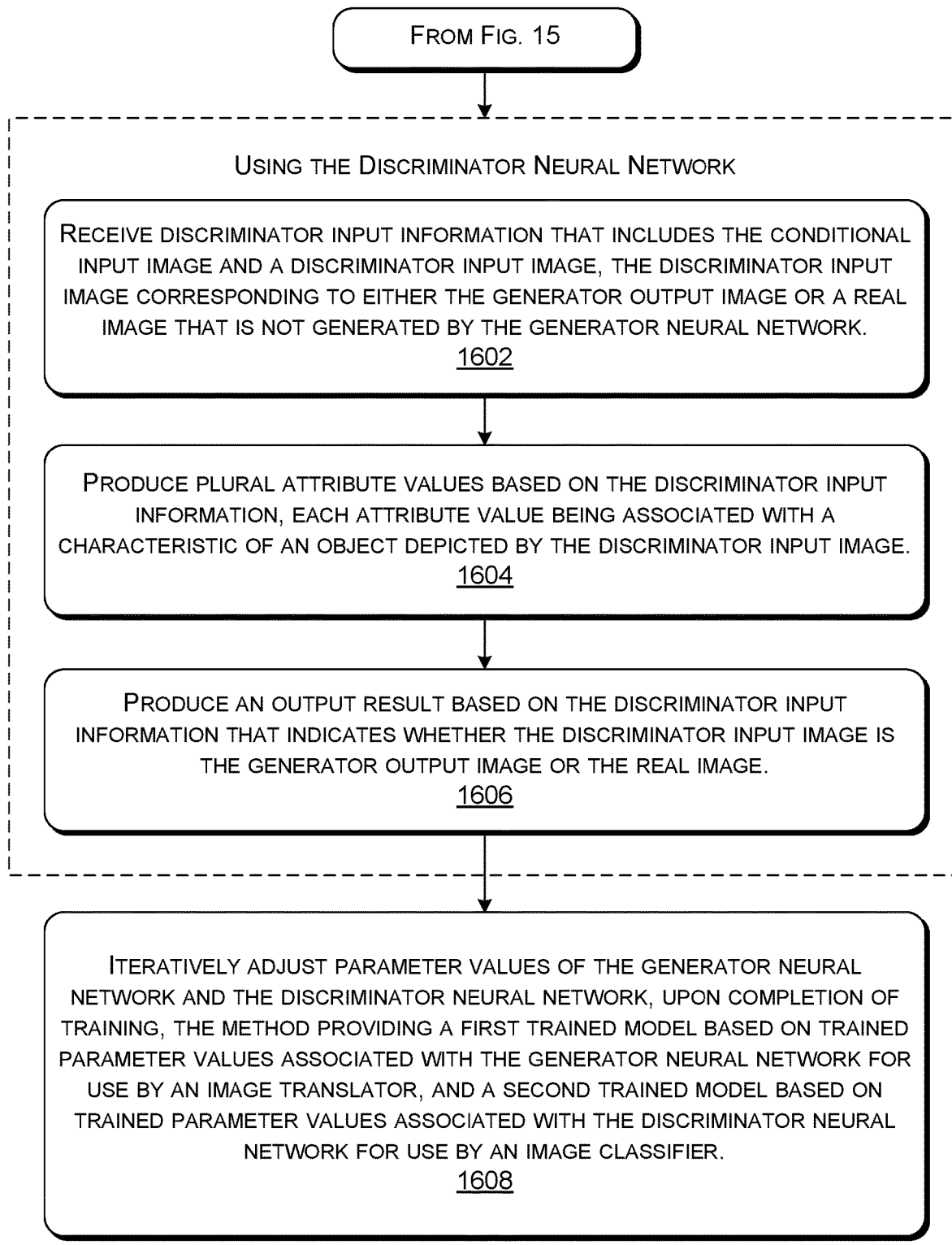

FIGS. 15 and 16 together show a process 1502 for training the conditional generative adversarial network (GAN) 104. The method includes processing by the generator 108 and the discriminator 110. The processing by the generator 108 includes the following operations. In block 1504, the generator 108 receives generator input information that includes a conditional input image and one or more conditional input values. In block 1506, the generator 108 transforms the generator input information into a generator output image. The one or more conditional input values describe one or more desired characteristics of the generator output image.

The processing by the discriminator 110 includes the following operations. In block 1602, the discriminator 110 receives discriminator input information that includes the conditional input image and a discriminator input image, the discriminator input image corresponding to either the generator output image or a real image that is not generated by the generator 108. In block 1604, the discriminator 110 produces plural attribute values based on the discriminator input information, each attribute value being associated with a characteristic of an object depicted by the discriminator input image. In block 1606, the discriminator 110 produces an output result based on the discriminator input information that indicates whether the discriminator input image is the generator output image or the real image.

In block 1608, the parameter-updating system 106 iteratively adjusts parameter values of the generator 108 and the discriminator 110. Upon completion of training, the parameter-updating system 106 provides a first trained model based on trained parameter values associated with the generator 108 for use by an image translator 312, and a second trained model based on trained parameter values associated with the discriminator 110 for use by an image classifier 408.

Figure 17:
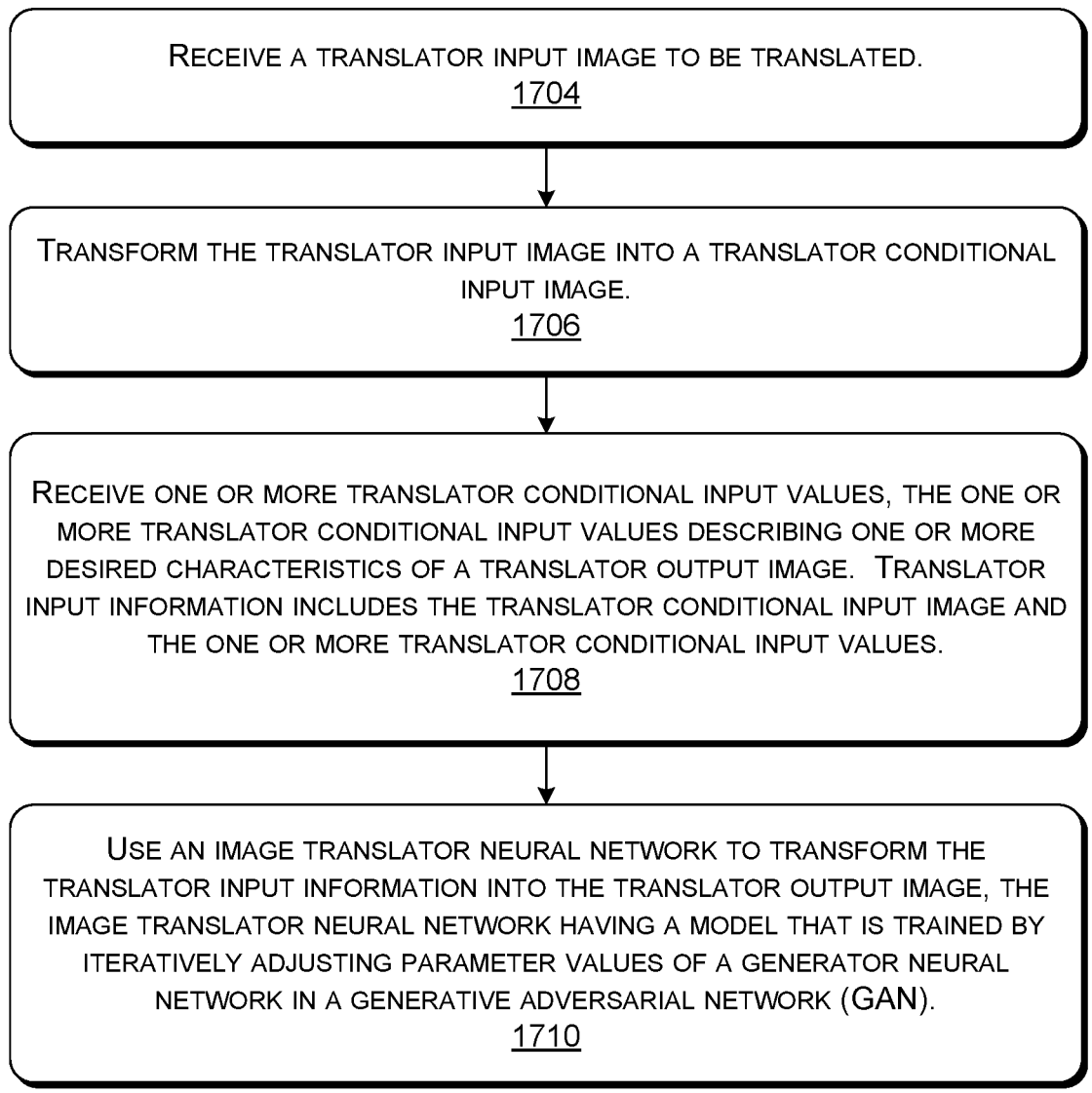
FIG. 17 shows a process that describes one manner of operation of the image translator system of FIG. 3.

FIG. 17 shows a process 1702 that describes one illustrative manner of operation of the image translator system 302 of FIG. 3. In block 1704, the image translator system 302 receives a translator input image to be translated. In block 1706, the image translator system 302 transforms the translator input image into a translator conditional input image; this operation can be performed in advance or in an on-demand manner. In block 1708, the image translator system 302 receives one or more translator conditional input values, the one or more translator conditional input values describing one or more desired characteristics of a translator output image. Translator input information includes the translator conditional input image and the one or more translator conditional input values. In block 1710, the image translator system 302 uses an image translator 312 to transform the translator input information into the translator output image. The image translator 312 has a model that is trained by iteratively adjusting parameter values of the generator neural network 108 in the generative adversarial network (GAN) 104.

Figure 18:
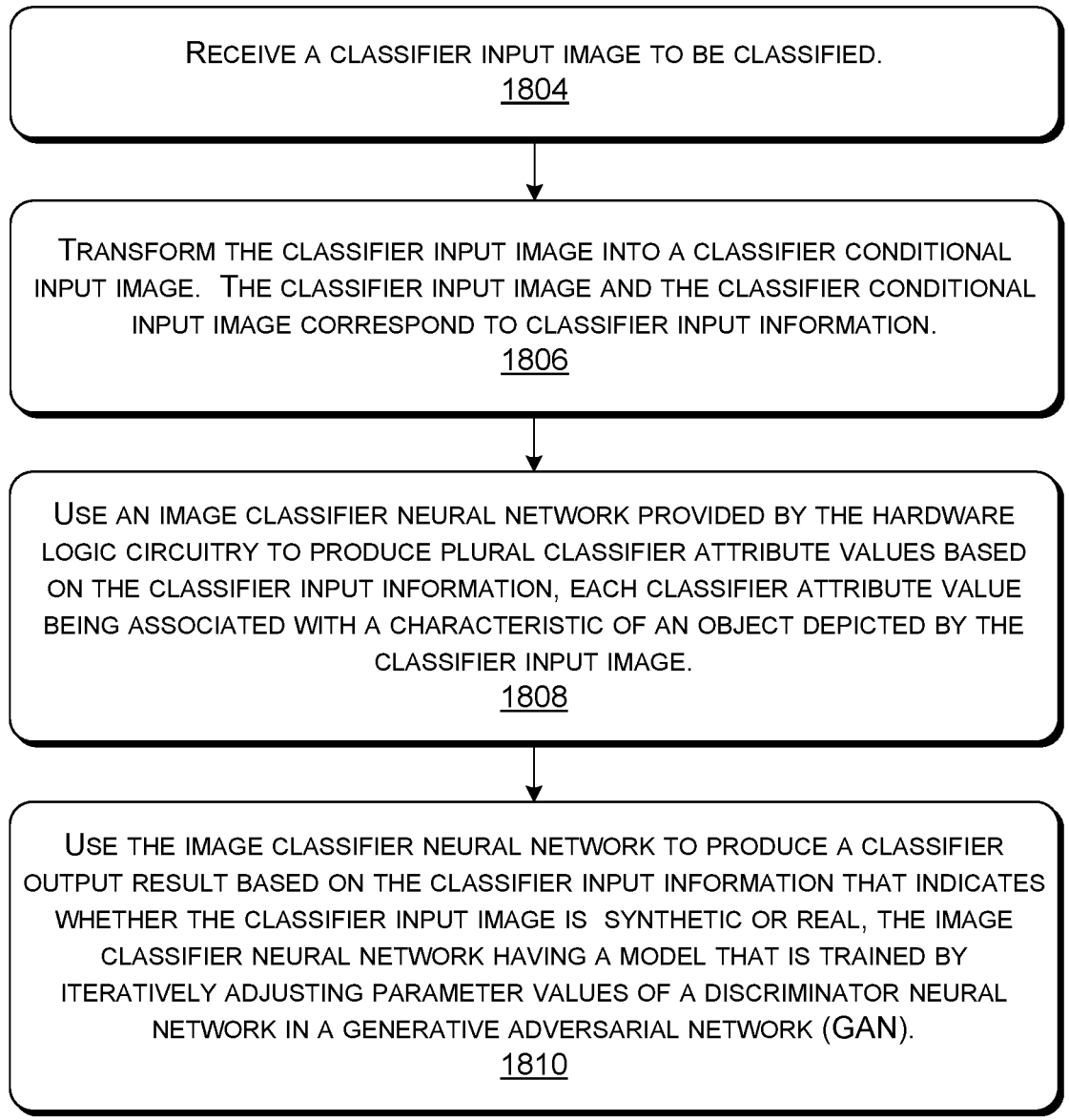
FIG. 18 shows a process that describes one manner of operation of the image classifier system of FIG. 4.

FIG. 18 shows a process 1802 that describes one illustrative manner of operation of the image classifier system 402 of FIG. 4. In block 1804, the image classifier system 402 receives a classifier input image to be classified. In block 1806, the image classifier system 402 transforms the classifier input image into a classifier conditional input image; this operation can be performed in advance or in an on-demand manner. Classifier input information includes the classifier input image and the classifier conditional input image. In block 1808, the image classifier system 402 uses an image classifier 408 to produce plural classifier attribute values based on the classifier input information, each classifier attribute value being associated with a characteristic of an object depicted by the classifier input image. In block 1810, the image classifier system 402 uses the image classifier 408 to produce a classifier output result based on the classifier input information that indicates whether the classifier input image is synthetic or real. The image classifier 408 has a model that is trained by iteratively adjusting parameter values of the discriminator 110 in the generative adversarial network (GAN) 104.

C. Representative Computing Functionality

Figure 19:
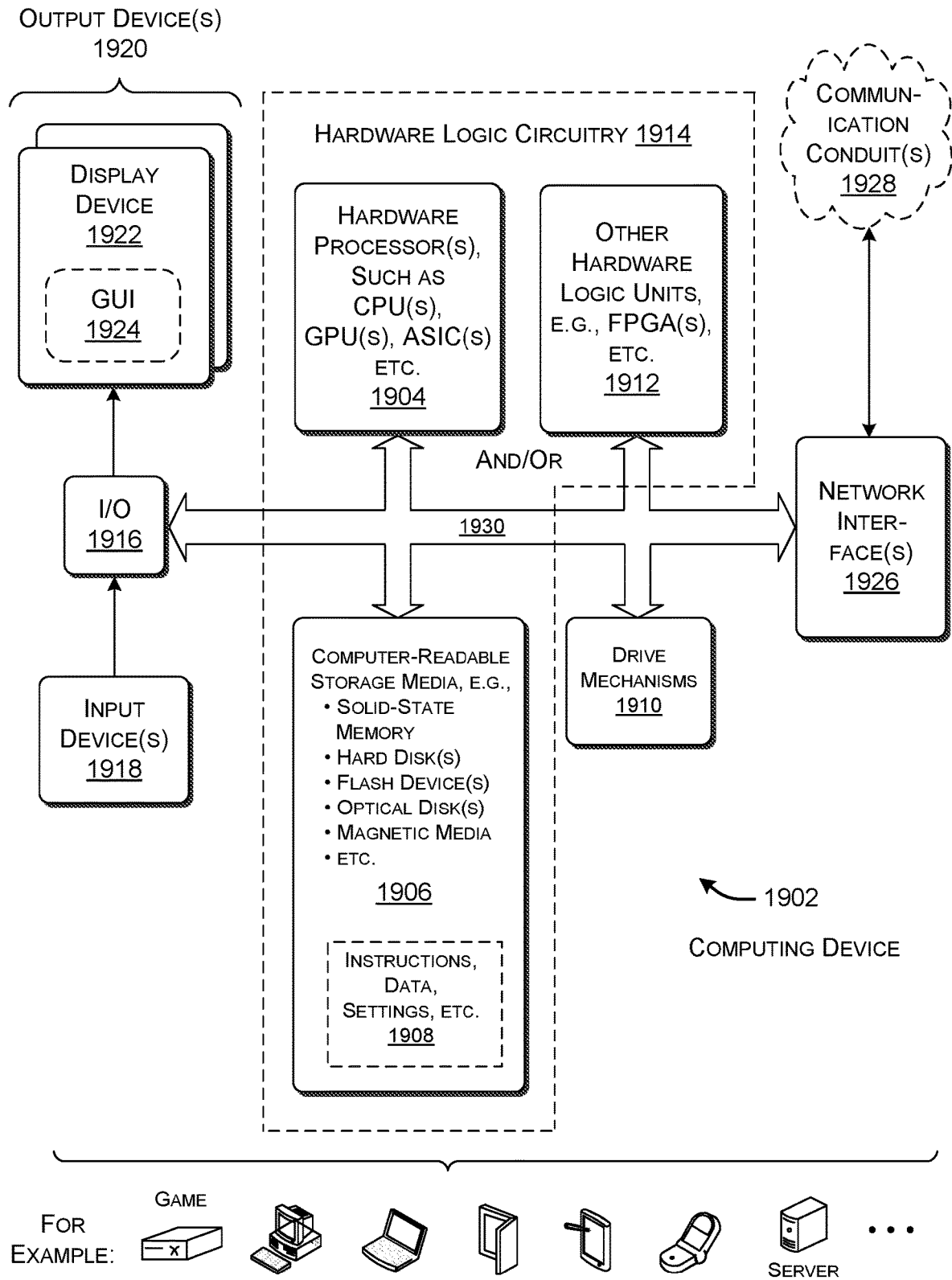
FIG. 19 shows an illustrative type of computing device that can be used to implement any aspect of the features shown in the foregoing drawings.

FIG. 19 shows a computing device 1902 that can be used to implement any aspect of the mechanisms set forth in the above-described figures. For instance, with reference to FIG. 5, the type of computing device 1902 shown in FIG. 19 can be used to implement any user computing device and any server. In all cases, the computing device 1902 represents a physical and tangible processing mechanism.

The computing device 1902 can include one or more hardware processors 1904. The hardware processor(s) 1904 can include, without limitation, one or more Central Processing Units (CPUs), and/or one or more Graphics Processing Units (GPUs), and/or one or more Application Specific Integrated Circuits (ASICs), etc. More generally, any hardware processor can correspond to a general-purpose processing unit or an application-specific processor unit.

The computing device 1902 can also include computer-readable storage media 1906, corresponding to one or more computer-readable media hardware units. The computer-readable storage media 1906 retains any kind of information 1908, such as machine-readable instructions, settings, data, etc. Without limitation, for instance, the computer-readable storage media 1906 may include one or more solid-state devices, one or more magnetic hard disks, one or more optical disks, magnetic tape, and so on. Any instance of the computer-readable storage media 1906 can use any technology for storing and retrieving information. Further, any instance of the computer-readable storage media 1906 may represent a fixed or removable unit of the computing device 1902. Further, any instance of the computer-readable storage media 1906 may provide volatile or non-volatile retention of information.

The computing device 1902 can utilize any instance of the computer-readable storage media 1906 in different ways. For example, any instance of the computer-readable storage media 1906 may represent a hardware memory unit (such as Random Access Memory (RAM)) for storing transient information during execution of a program by the computing device 1902, and/or a hardware storage unit (such as a hard disk) for retaining/archiving information on a more permanent basis. In the latter case, the computing device 1902 also includes one or more drive mechanisms 1910 (such as a hard drive mechanism) for storing and retrieving information from an instance of the computer-readable storage media 1906.

The computing device 1902 may perform any of the functions described above when the hardware processor(s) 1904 carry out computer-readable instructions stored in any instance of the computer-readable storage media 1906. For instance, the computing device 1902 may carry out computer-readable instructions to perform each block of the processes described in Section B.

Alternatively, or in addition, the computing device 1902 may rely on one or more other hardware logic units 1912 to perform operations using a task-specific collection of logic gates. For instance, the hardware logic unit(s) 1912 may include a fixed configuration of hardware logic gates, e.g., that are created and set at the time of manufacture, and thereafter unalterable. Alternatively, or in addition, the other hardware logic unit(s) 1912 may include a collection of programmable hardware logic gates that can be set to perform different application-specific tasks. The latter category of devices includes, but is not limited to Programmable Array Logic Devices (PALs), Generic Array Logic Devices (GALs), Complex Programmable Logic Devices (CPLDs), Field-Programmable Gate Arrays (FPGAs), etc.

FIG. 19 generally indicates that hardware logic circuitry 1914 includes any combination of the hardware processor(s) 1904, the computer-readable storage media 1906, and/or the other hardware logic unit(s) 1912. That is, the computing device 1902 can employ any combination of the hardware processor(s) 1904 that execute machine-readable instructions provided in the computer-readable storage media 1906, and/or one or more other hardware logic unit(s) 1912 that perform operations using a fixed and/or programmable collection of hardware logic gates. More generally stated, the hardware logic circuitry 1914 corresponds to one or more hardware logic units of any type(s) that perform operations based on logic stored in and/or otherwise embodied in the hardware logic unit(s).

In some cases (e.g., in the case in which the computing device 1902 represents a user computing device), the computing device 1902 also includes an input/output interface 1916 for receiving various inputs (via input devices 1918), and for providing various outputs (via output devices 1920). Illustrative input devices include a keyboard device, a mouse input device, a touchscreen input device, a digitizing pad, one or more static image cameras, one or more video cameras, one or more depth camera systems, one or more microphones, a voice recognition mechanism, any movement detection mechanisms (e.g., accelerometers, gyroscopes, etc.), and so on. One particular output mechanism may include a display device 1922 and an associated graphical user interface presentation (GUI) 1924. The display device 1922 may correspond to a liquid crystal display device, a light-emitting diode display (LED) device, a cathode ray tube device, a projection mechanism, etc. Other output devices include a printer, one or more speakers, a haptic output mechanism, an archival mechanism (for storing output information), and so on. The computing device 1902 can also include one or more network interfaces 1926 for exchanging data with other devices via one or more communication conduits 1928. One or more communication buses 1930 communicatively couple the above-described units together.

The communication conduit(s) 1928 can be implemented in any manner, e.g., by a local area computer network, a wide area computer network (e.g., the Internet), point-to-point connections, etc., or any combination thereof. The communication conduit(s) 1928 can include any combination of hardwired links, wireless links, routers, gateway functionality, name servers, etc., governed by any protocol or combination of protocols.

FIG. 19 shows the computing device 1902 as being composed of a discrete collection of separate units. In some cases, the collection of units may correspond to discrete hardware units provided in a computing device chassis having any form factor. FIG. 19 shows illustrative form factors in its bottom portion. In other cases, the computing device 1902 can include a hardware logic unit that integrates the functions of two or more of the units shown in FIG. 1. For instance, the computing device 1902 can include a system on a chip (SoC or SOC), corresponding to an integrated circuit that combines the functions of two or more of the units shown in FIG. 19.

The following summary provides a non-exhaustive set of illustrative examples of the technology set forth herein.

According to a first example, one or more computing devices are described for performing machine training. The computing device(s) include a conditional generative adversarial network (GAN) including a generator neural network and a discriminator neural network. The generator neural network is configured to: receive generator input information that includes a conditional input image and one or more conditional input values; and transform the generator input information into a generator output image, wherein the one or more conditional input values describe one or more desired characteristics of the generator output image. The discriminator neural network is configured to: receive discriminator input information that includes the conditional input image and a discriminator input image, the discriminator input image corresponding to either the generator output image or a real image that is not generated by the generator neural network; produce plural attribute values based on the discriminator input information, each attribute value being associated with a characteristic of an object depicted by the discriminator input image; and produce an output result based on the discriminator input information that indicates whether the discriminator input image is the generator output image or the real image. The device(s) also includes a parameter-updating system for iteratively adjusting parameter values of the generator neural network and the discriminator neural network. Upon completion of training, the parameter-updating system provides a first trained model based on trained parameter values associated with the generator neural network for use by an image translator, and a second trained model based on trained parameter values associated with the discriminator neural network for use by an image classifier. The GAN and the parameter-updating system are implemented by hardware logic circuitry provided by the one or more computing devices.

According to a second example, the conditional input image is a transformed version of the real image.

According to a third example, the discriminator neural network includes a convolutional neural network for mapping the discriminator input information into feature information, and plural individual classifier neural networks for respectively producing the plural attribute values and the output result that conveys whether the discriminator input information includes the generator output image or the real image.

According to a fourth example, a method is described for training a conditional generative adversarial network (GAN). The method includes using a generator neural network of the GAN to: receive generator input information that includes a conditional input image and one or more conditional input values; and transform the generator input information into a generator output image, wherein the one or more conditional input values describes one or more desired characteristics of the generator output image. The method also includes using a discriminator neural network of the GAN to: receive discriminator input information that includes the conditional input image and a discriminator input image, the discriminator input image corresponding to either the generator output image or a real image that is not generated by the generator neural network; produce plural attribute values based on the discriminator input information, each attribute value being associated with a characteristic of an object depicted by the discriminator input image; and produce an output result based on the discriminator input information that indicates whether the discriminator input image is the generator output image or the real image. The method further includes iteratively adjusting parameter values of the generator neural network and the discriminator neural network. Upon completion of training, the method provides a first trained model based on trained parameter values associated with the generator neural network for use by an image translator, and a second trained model based on trained parameter values associated with the discriminator neural network for use by an image classifier.

According to a fifth example, relating to the fourth example, the conditional input image is a transformed version of the real image.

According to a sixth example, relating to the fourth example, the discriminator neural network includes a convolutional neural network for mapping the discriminator input information into feature information, and plural individual classifier neural networks for respectively producing the plural attribute values and the output result that conveys whether the discriminator input information includes the generator output image or the real image.

According to a seventh example, relating to the fourth example, the method further includes using the image translator by: receiving translator input information that includes a translator conditional input image, the translator conditional input image being generated by transforming a translator input image, the translator input information also including one or more translator conditional input values, the one or more translator conditional input values describing one or more desired characteristics of a translator output image; and using the image translator to transform the translator input information into the translator output image.

According to an eighth example, relating to the seventh example, the method further includes: providing an electronic document to a user computing device operated by a user, the electronic document including the translator input image and a graphical control that enables the user to enter the one or more translator conditional input values. The one or more translator conditional input values are received in response to interaction by the user with the graphical control. The method further includes sending the translator output image to the user computing device for presentation to the user.

According to a ninth example, relating to the eighth example, the translator output image is presented in the electronic document in which the translator input image appears.

According to a tenth example, relating to the fourth example, the method further includes using the image classifier by: receiving classifier input information that includes a classifier input image and a classifier conditional input image, the classifier conditional input image being generated by transforming the classifier input image; producing plural classifier attribute values based on the classifier input information, each classifier attribute value being associated with a characteristic of an object depicted by the classifier input image; and producing a classifier output result based on the classifier input information that indicates whether the translator input image is synthetic or real.

According to an eleventh example, relating to the tenth example, the classifier input image appears on an electronic document presented to a user computing device operated by a user, and wherein the method further includes: identifying a supplemental content item based on the plural classifier attribute values; and sending the supplemental content item to the user computing device for presentation to the user.

According to a twelfth example, relating to the eleventh example the supplemental content item is presented in the electronic document in which the classifier input image appears.

According to a thirteenth example, an image translator is described that is produced by the method of the fourth example.

According to a fourteenth example, an image classifier is described that is produced by the method of the fourth example.

According to a fifteenth example, an image classification system is described that is implemented by one or more computing devices. The image classification system includes hardware logic circuitry configured to: receive a classifier input image to be classified; transform the classifier input image into a classifier conditional input image, the classifier input image and the classifier conditional input image corresponding to classifier input information; use an image classifier neural network provided by the hardware logic circuitry to produce plural classifier attribute values based on the classifier input information, each classifier attribute value being associated with a characteristic of an object depicted by the classifier input image; and use the image classifier neural network to produce a classifier output result based on the classifier input information that indicates whether the classifier input image is synthetic or real. The image classifier neural network has a model that is trained by iteratively adjusting parameter values of a discriminator neural network in a generative adversarial network (GAN).

According to a sixteenth example, relating to the fifteenth example, the GAN includes a generator neural network configured to: receive generator input information that includes a generator conditional input image and one or more generator conditional input values; and transform the generator input information into a generator output image, the one or more generator conditional input values describing one or more desired characteristics of the generator output image. The discriminator neural network is configured to: receive discriminator input information that includes the generator conditional input image and a discriminator input image, the discriminator input image corresponding to either the generator output image or a real image that is not generated by the generator neural network; produce plural discriminator attribute values based on the discriminator input information, each discriminator attribute value being associated with a characteristic of an object depicted by the discriminator input image; and produce a discriminator output result based on the discriminator input information that indicates whether the discriminator input image is the generator output image or a real image.

According to a seventeenth example, relating to the sixteenth example, each generator conditional input image fed to the generator neural network and the discriminator neural network is produced by a same image transformation that is used to produce the classifier conditional input image.

According to an eighteenth example, relating to the fifteenth example, the classifier neural network includes a convolutional neural network for mapping the classifier input information into feature information, and plural individual classifier neural networks for respectively producing the plural classifier attribute values and the classifier output result that conveys whether the classifier input information is synthetic or real.

According to a nineteenth example, relating to the fifteenth example, the plural classifier attribute values include any two or more classes selected from: a category class; a color class; a department class; a material class; and a pattern class.

According to a twentieth example, relating to the fifteenth example, the classifier input image originates from an electronic document with which a user is interacting via a user computing device.

A twenty-first aspect corresponds to any combination (e.g., any logically consistent permutation or subset) of the above-referenced first through twentieth aspects.

A twenty-second aspect corresponds to any method counterpart, device counterpart, system counterpart, means-plus-function counterpart, computer-readable storage medium counterpart, data structure counterpart, article of manufacture counterpart, graphical user interface presentation counterpart, etc. associated with the first through twenty-first aspects.

In closing, the functionality described herein can employ various mechanisms to ensure that any user data is handled in a manner that conforms to applicable laws, social norms, and the expectations and preferences of individual users. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

Further, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. One or more computing devices for performing machine training, comprising:
    a conditional generative adversarial network (GAN) including a generator neural network and a discriminator neural network,
    the generator neural network being configured to:
        receive generator input information that includes a conditional input image and plural conditional input values; and
        transform the generator input information into a generator output image,
        the plural conditional input values describing plural respective characteristics of the generator output image associated with plural respective attribute types,
    the discriminator neural network being configured to:
        receive discriminator input information that includes the conditional input image and a discriminator input image, the discriminator input image corresponding to either the generator output image or a real image that is not generated by the generator neural network;
        produce plural attribute values based on the discriminator input information, each attribute value being associated with a characteristic of an object depicted by the discriminator input image,
        the plural attribute values being associated with the same plural attribute types as the plural conditional input values; and
        produce an output result based on the discriminator input information that indicates whether the discriminator input image is the generator output image or the real image; and
    a parameter-updating system for iteratively adjusting parameter values of the generator neural network and the discriminator neural network,
    upon completion of training, the parameter-updating system providing a first trained model based on trained parameter values associated with the generator neural network, and a second trained model based on trained parameter values associated with the discriminator neural network for use by an inference-stage image classifier without the first trained model,
    the GAN and the parameter-updating system being implemented by hardware logic circuitry provided by said one or more computing devices.

2. The one or more computing devices of claim 1, wherein the conditional input image is a transformed version of the real image.

3. The one or more computing devices of claim 1, wherein the discriminator neural network includes a convolutional neural network for mapping the discriminator input information into feature information, and plural individual classifier neural networks for respectively producing the plural attribute values and the output result that conveys whether the discriminator input information includes the generator output image or the real image.

4. The one or more computing devices of claim 1, wherein the inference-stage image classifier is configured to receive classifier input information that includes a classifier input image and a classifier conditional input image, the classifier conditional input image being generated by transforming the classifier input image without use of the first trained model.

5. The one or more computing devices of claim 1, wherein the training involves increasing a number of training examples fed to the discriminator neural network by providing different sets of attribute values to the generator neural network for the same conditional input image.

6. The one or more computing devices of claim 1, wherein the discriminator neural network is configured to reduce a number of channels in the discriminator input information before further processing.

7. A method for training a conditional generative adversarial network (GAN), including:
    using a generator neural network of the GAN to:
        receive generator input information that includes a conditional input image and plural conditional input values; and
        transform the generator input information into a generator output image,
        the plural conditional input conditional input values describing plural respective characteristics of
    the generator output image associated with plural respective attribute types, using a discriminator neural network of the GAN to:
        receive discriminator input information that includes the conditional input image and a discriminator input image, the discriminator input image corresponding to either the generator output image or a real image that is not generated by the generator neural network;

produce plural attribute values based on the discriminator input information, each attribute value being associated with a characteristic of an object depicted by the discriminator input image, the plural attribute values being associated with the same plural attribute types as the plural conditional input values; and produce an output result based on the discriminator input information that indicates whether the discriminator input image is the generator output image or the real image; and iteratively adjusting parameter values of the generator neural network and the discriminator neural network, upon completion of training, the method providing a first trained model based on trained parameter values associated with the generator neural network, and a second trained model based on trained parameter values associated with the discriminator neural network for use by an inference-stage image classifier without the use of the first trained model.

8. The method of claim 7, wherein the conditional input image is a transformed version of the real image.

9. The method of claim 7, wherein the discriminator neural network includes a convolutional neural network for mapping the discriminator input information into feature information, and plural individual classifier neural networks for respectively producing the plural attribute values and the output result that conveys whether the discriminator input information includes the generator output image or the real image.

10. The method of claim 7, further comprising using the inference-stage image classifier by:

receiving classifier input information that includes a classifier input image and a classifier conditional input image, the classifier conditional input image being generated by transforming the classifier input image without use of the first trained model;

producing plural classifier attribute values based on the classifier input information, each classifier attribute value being associated with a characteristic of an object depicted by the classifier input image; and producing a classifier output result based on the classifier input information that indicates whether the translator input image is synthetic or real.

11. An image translator produced by the method of claim 7.

12. An image classifier produced by the method of claim 7.

13. The method of claim 7, wherein the training involves increasing a number of training examples fed to the discriminator neural network by providing different sets of attribute values to the generator neural network for the same conditional input image.

14. The method of claim 10, wherein the classifier input image appears on an electronic document presented to a user computing device operated by a user, and wherein the method further includes:

identifying a supplemental content item based on said plural classifier attribute values; and sending the supplemental content item to the user computing device for presentation to the user.

15. The method of claim 14, wherein the supplemental content item is presented in the electronic document in which the classifier input image appears.

16. An image classification system implemented by one or more computing devices, for operation in an inference stage, comprising:

hardware logic circuitry configured to:

receive a classifier input image to be classified;

transform the classifier input image into a classifier conditional input image, the classifier input image and the classifier conditional input image corresponding to classifier input information;

use an image classifier neural network provided by the hardware logic circuitry to produce plural classifier attribute values based on the classifier input information, each classifier attribute value being associated with a characteristic of an object depicted by the classifier input image; and use the image classifier neural network to produce a classifier output result based on the classifier input information that indicates whether the classifier input image is synthetic or real, the image classifier neural network having a model that is trained, in a prior training process, by iteratively adjusting parameter values of a discriminator neural network in a generative adversarial network (GAN), wherein the GAN includes a generator neural network in addition to the discriminator neural network, the generator neural network being configured to:

receive generator input information that includes a generator conditional input image and plural generator conditional input values; and transform the generator input information into a generator output image, the plural generator conditional input values describing plural respective characteristics of the generator output image associated with plural respective attribute types, the discriminator neural network being configured to:

receive discriminator input information that includes the generator conditional input image and a discriminator input image, the discriminator input image corresponding to either the generator output image or a real image that is not generated by the generator neural network;

produce plural discriminator attribute values based on the discriminator input information, each discriminator attribute value being associated with a characteristic of an object depicted by the discriminator input image, the plural discriminator attribute values being associated with the same plural attribute types as the plural generator conditional input values; and produce a discriminator output result based on the discriminator input information that indicates whether the discriminator input image is the generator output image or a real image.

17. The image classification system of claim 16, wherein each generator conditional input image fed to the generator neural network and the discriminator neural network is produced by a same image transformation that is used to produce the classifier conditional input image.

18. The image classification system of claim 16, wherein the classifier neural network includes a convolutional neural network for mapping the classifier input information into feature information, and plural individual classifier neural networks for respectively producing the plural classifier attribute values and the classifier output result that conveys whether the classifier input information is synthetic or real.

19. The image classification system of claim 16, wherein the plural attribute types include any two or more attribute types selected from: a category attribute type; a color attribute type; a department attribute type; a material attribute type; and a pattern attribute type.

20. The image classification system of claim 16, wherein the classifier input image originates from an electronic document with which a user is interacting via a user computing device.

\* \* \* \* \*